United States Patent
Chanyontpatanakul

(10) Patent No.: US 10,481,789 B2
(45) Date of Patent: *Nov. 19, 2019

(54) METHOD FOR PROVIDING A GRAPHICAL USER INTERFACE FOR AN ELECTRONIC TRANSACTION WITH A HANDHELD TOUCH SCREEN DEVICE

(71) Applicant: VISA INTERNATIONAL SERVICE ASSOCIATION, San Francisco, CA (US)

(72) Inventor: Yothin Chanyontpatanakul, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/993,892

(22) Filed: May 31, 2018

(65) Prior Publication Data

US 2018/0275866 A1 Sep. 27, 2018

Related U.S. Application Data

(63) Continuation of application No. 14/292,341, filed on May 30, 2014, now Pat. No. 9,990,126.

(51) Int. Cl.
  *G06F 3/0482* (2013.01)
  *G06F 3/0488* (2013.01)
  *G06Q 30/06* (2012.01)

(52) U.S. Cl.
  CPC ........ *G06F 3/04883* (2013.01); *G06F 3/0482* (2013.01); *G06Q 30/0641* (2013.01)

(58) Field of Classification Search
  CPC .................................................... G06F 3/0482
  USPC ......................................................... 715/763
  See application file for complete search history.

(56) References Cited

U.S. PATENT DOCUMENTS

| | | | |
|---|---|---|---|
| 6,710,788 B1 | 3/2004 | Freach | |
| 8,223,127 B2 | 7/2012 | Park | |
| 8,239,784 B2 | 8/2012 | Hotelling | |
| 8,732,617 B1* | 5/2014 | Armstrong | G06F 3/04817 715/835 |
| 8,743,411 B2* | 6/2014 | Bachman | G06T 1/00 358/1.15 |
| 8,769,431 B1 | 7/2014 | Prasad | |
| 8,896,632 B2 | 11/2014 | MacDougall | |
| 8,949,250 B1* | 2/2015 | Garg | H04L 67/10 707/748 |
| 9,195,368 B2 | 11/2015 | Kuscher | |
| 9,830,056 B1* | 11/2017 | Keely | G06F 3/0481 |
| 2006/0026521 A1* | 2/2006 | Hotelling | G06F 3/0418 715/702 |
| 2007/0070066 A1* | 3/2007 | Bakhash | G06F 3/04815 345/419 |

(Continued)

*Primary Examiner* — Daniel Rodriguez
(74) *Attorney, Agent, or Firm* — Loeb & Loeb LLP

(57) ABSTRACT

The method provides a graphical user interface for an electronic transaction with a handheld touch screen device. An input display is oriented to be operable by actions of a thumb of a user and accepts inputs from the user. If the user swipes in a vertical direction, additional information about an object is displayed. If a user swipes down, less information about an object is displayed. If a user swipes laterally, an additional object is displayed, and if a user taps, the object for use in an electronic transaction is displayed.

20 Claims, 29 Drawing Sheets

(56) References Cited

U.S. PATENT DOCUMENTS

| | | | |
|---|---|---|---|
| 2007/0236475 A1 | 10/2007 | Wherry | |
| 2009/0064055 A1* | 3/2009 | Chaudhri | G06F 3/04817 715/863 |
| 2010/0053216 A1* | 3/2010 | Iwase | G06F 3/0483 345/634 |
| 2010/0153844 A1* | 6/2010 | Hwang | G06F 3/04817 715/702 |
| 2010/0211872 A1* | 8/2010 | Rolston | G06F 3/0482 715/702 |
| 2011/0069019 A1* | 3/2011 | Carpendale | G06F 3/0425 345/173 |
| 2011/0252369 A1 | 10/2011 | Chaudhri | |
| 2011/0270824 A1* | 11/2011 | Morris | G06F 16/9038 707/722 |
| 2012/0013543 A1* | 1/2012 | Shenfield | G06F 3/0481 345/173 |
| 2012/0274664 A1 | 11/2012 | Fagnou | |
| 2013/0007606 A1* | 1/2013 | Dolenc | G06F 17/24 715/256 |
| 2013/0047115 A1 | 2/2013 | Migos | |
| 2013/0091462 A1* | 4/2013 | Gray | G06F 3/0346 715/810 |
| 2013/0179833 A1 | 7/2013 | Stallings | |
| 2013/0239063 A1 | 9/2013 | Ubillos | |
| 2013/0275891 A1* | 10/2013 | Holiday | G06F 3/048 715/762 |
| 2013/0300674 A1 | 11/2013 | Davidson | |
| 2013/0311909 A1 | 11/2013 | Howard | |
| 2014/0004885 A1 | 1/2014 | Demaine | |
| 2014/0013276 A1 | 1/2014 | Butterworth | |
| 2014/0028602 A1 | 1/2014 | Morinaga | |
| 2014/0055384 A1 | 2/2014 | Cheng | |
| 2014/0082534 A1* | 3/2014 | Cleron | G06F 3/048 715/764 |
| 2014/0137035 A1* | 5/2014 | Yentur | G06F 3/04883 715/786 |
| 2014/0152541 A1* | 6/2014 | Murarka | G06F 3/0488 345/156 |
| 2014/0223376 A1* | 8/2014 | Tarvainen | H04N 5/23216 715/833 |
| 2014/0282001 A1* | 9/2014 | Lau | G06F 3/0488 715/723 |
| 2014/0357312 A1* | 12/2014 | Davis | G06F 3/04842 455/550.1 |
| 2014/0365882 A1* | 12/2014 | Lemay | G06F 3/0488 715/269 |
| 2014/0365945 A1 | 12/2014 | Karunamuni | |
| 2014/0372296 A1* | 12/2014 | Tatham | G06T 11/001 705/40 |
| 2014/0380209 A1 | 12/2014 | Tsukamoto | |
| 2015/0019418 A1* | 1/2015 | Hotard | G06Q 20/36 705/41 |
| 2015/0033123 A1* | 1/2015 | Arrasvuori | G06F 3/165 715/716 |
| 2015/0067556 A1* | 3/2015 | Tibrewal | G06F 16/285 715/765 |
| 2015/0089359 A1 | 3/2015 | Brisebois | |
| 2015/0089360 A1 | 3/2015 | Brisebois | |
| 2015/0089386 A1* | 3/2015 | Brisebois | G06F 3/0488 715/746 |
| 2015/0095222 A1 | 4/2015 | Narendra | |
| 2015/0095847 A1* | 4/2015 | Kleinhout | G06F 16/95 715/784 |
| 2015/0100885 A1 | 4/2015 | Riley | |
| 2015/0193135 A1 | 7/2015 | Kim | |
| 2015/0199073 A1* | 7/2015 | Kukulski | G06F 3/0488 715/765 |
| 2015/0212667 A1 | 7/2015 | Holt | |
| 2015/0324271 A1* | 11/2015 | Glass | G06F 3/0482 707/706 |
| 2015/0370908 A1* | 12/2015 | Grinev | G06F 3/0482 707/722 |

\* cited by examiner

METHOD FOR PROVIDING A GRAPHICAL USER INTERFACE FOR AN ELECTRONIC TRANSACTION WITH A HANDHELD TOUCH SCREEN DEVICE

CROSS-REFERENCE TO RELATED APPLICATION

This is a continuation patent application of U.S. nonprovisional patent application Ser. No. 14/292,341, filed on May 30, 2014, whose disclosure is incorporated by reference in its entirety herein.

BACKGROUND

Entirely electronic purchase transactions are now frequently made using portable touch screen devices. These purchases are often conducted with handheld devices that use touch screens to receive user input. Current navigation menus for graphical user interfaces of mobile web pages and applications often mimic the layout of web browser navigation menus designed to be used with laptops or desktop computers with peripheral devices such as a keyboard and mouse. Mobile web sites and applications that are specifically designed for use with mobile touch screen devices exploit the entire touch screen surface but are difficult to navigate with a single hand. Current navigation menus and are also difficult to navigate for users with very small or very large hands.

SUMMARY

A method is disclosed for providing a graphical user interface of an electronic transaction with a handheld touch screen device. The method includes displaying, on a touch sensitive handheld computing device, an input display wherein the display is oriented to be operable by actions of a thumb of a user and accepting inputs from the user. If the user swipes in a vertical direction, additional information about an object may be displayed. If a user swipes down, less information is displayed about an object. If a user swipes laterally, an additional object is displayed. If a user taps, the object is selected for use in an electronic transaction.

SPECIFICATION

A method for providing a graphical user interface for an electronic transaction with a handheld touch screen device is disclosed. With the development and improvement in mobile technology, purchases can now be made on mobile devices, smart phone, tablet computers, and other portable handheld devices. Many of these devices operate through touch sensitive screen technology. A goal of the invention is to provide an ergonomic, aesthetically pleasing graphical user interface allowing the user of a handheld device to conduct electronic transactions. A further goal of the invention is to strategically place interactive objects on the screen relative to the user's hand and to utilize intuitive and comfortable finger movements as touch commands providing the user with convenient menu navigation. Another goal of the invention is to provide a display that can be customized by the user's handedness or the user's preference in order provide a convenient display to conduct a purchase with a single hand. Yet another goal of the invention is to provide a display that can be customized by the user's handedness when the user is holding the device in either a portrait or a landscape orientation.

The method provides a graphical user interface to allow the user to conduct a purchase in a convenient, ergonomic, and aesthetically pleasing way. The FIGS. 2A-6E are arranged to show examples of various screens of a graphical user interface of the subject technology. FIGS. 2A-2F provide examples of graphical user interface screens when the screen is oriented in the portrait layout and provides a convenient layout for use with either hand. FIGS. 3A-3D and 4A-4D illustrate examples of graphical user interface screens when the screen is oriented in the portrait layout and provides a convenient layout for use with the right and left hand, respectively. FIGS. 5A-5E and 6A-6E provide examples of graphical user interface screens when the screen is oriented in the landscape layout for use with the right and left hand, respectively. Some figures provide alternative screens to other figures, so not all the provided figures may be used in some embodiments. Selected figures will be discussed with respect to the method of the subject technology of FIG. 1 although it is contemplated that the general flow of a transaction experience may include many variations of the provided figures or combinations of figures. Like features in subsequent figures have been similarly numbered for ease of reference.

Figure 1:
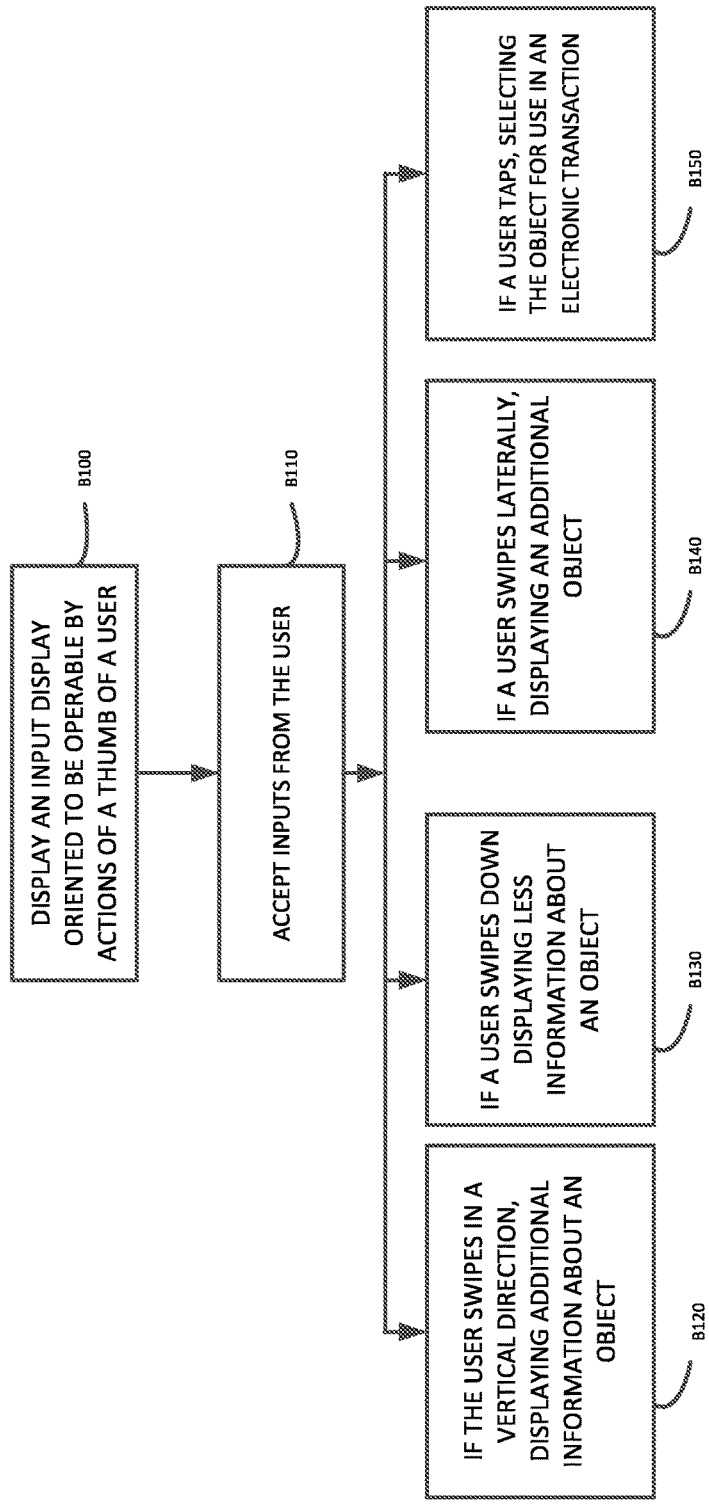
FIG. 1 is a flow diagram illustrating a method in accordance with an embodiment of the subject technology.
Figure 2A:
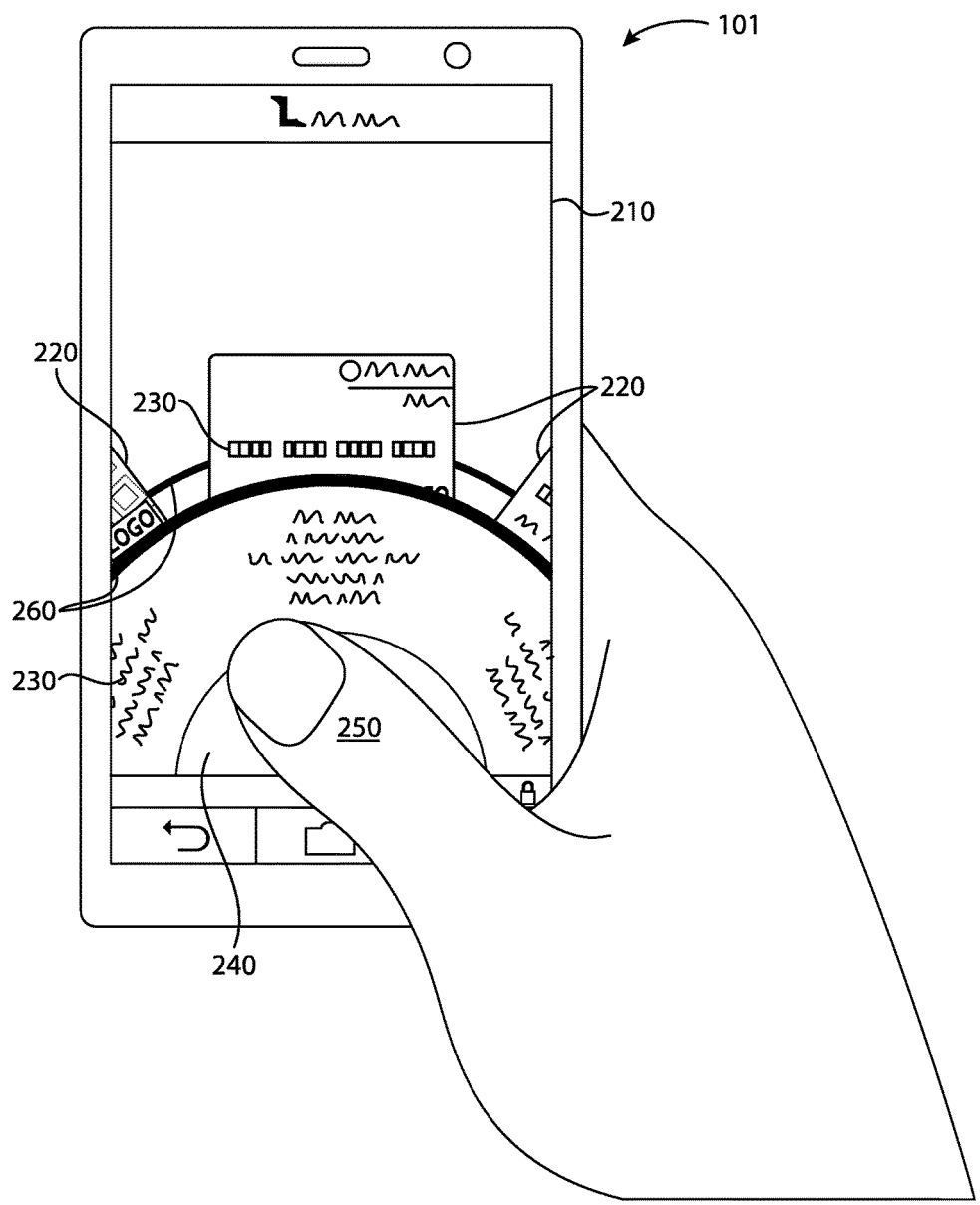
FIG. 2A is an illustration of a sample display in accordance with an embodiment of the subject technology as held by a user.

FIG. 1 is a flow diagram illustrating a method in accordance with an embodiment of the subject technology. In block B100, an input display is provided on a touch sensitive handheld computing device wherein the display is oriented to be operable by actions of a thumb of a user. As shown in FIG. 2A, the graphical user interface 210 of the handheld portable computing device 101 includes objects 220 and information 230 on the touch screen that are oriented in concentric arcs 260 near the center bottom of the handheld display. In addition to providing an aesthetic layout of the graphical user interface, the objects 220 and information 230 are proximate to the thumb 250 of the user's hand. A pay indicator 240 may be provided to facilitate completing a purchase. The graphical user interface 210 of is shown without the user's hand in FIG. 2B.

In block B110, inputs are accepted from the user. The beginning position of the thumb of the user 250 may determine which object 220, information 230, or pay indicator 240 is acted upon. An "object" as used herein encompasses its plain and ordinary meaning including, but not limited to, an icon, visual element, indicator. An object may be a visual representation of an existing electronic transaction device such as a credit card, debit card, checking card, smart card, or loyalty card. The visual representation of the card may correspond to the appearance of a physical card associated with the same account. An object such as a pay indicator may initiate or complete an electronic transaction when associated input is received.

"Information" as used herein encompasses its plain and ordinary meaning, including but not limited to, data associated with an object, data associated with the user, or data associated with the electronic transaction that is displayed on the graphical user interface 210. Information may appear on top of an object, and user touch input oriented over both an object and information appearing on top of the object may result in changes in the display associated with one or both of the object and information.

A preferred embodiment of the invention provides graphical user interfaces designed for input to be provided by one or both thumbs of the user, although input may be received from fingers or any another conductive or grounded instrument. Input may be in the form of one or more discrete commands, such as tapping the screen. Input may also be in the form of a continued motion such as swipe. Swiping may provide varying input depending on whether the swipe is horizontal, vertical, or in an arc. Based on the input provided from the user one or more of blocks B120, B130, B140, or B150 may occur.

Figure 2B:
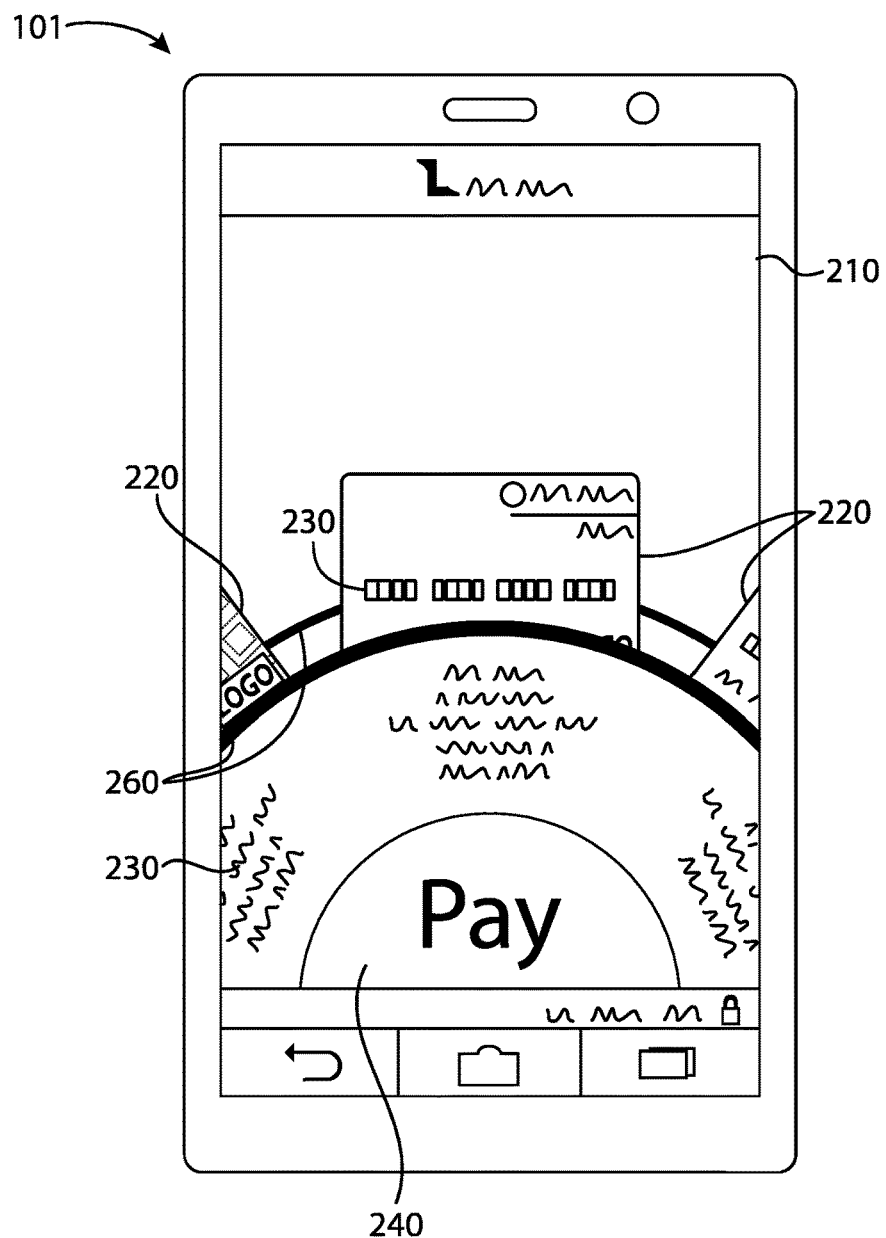
FIG. 2B is an illustration of the sample display of FIG. 2A.
Figure 2C:
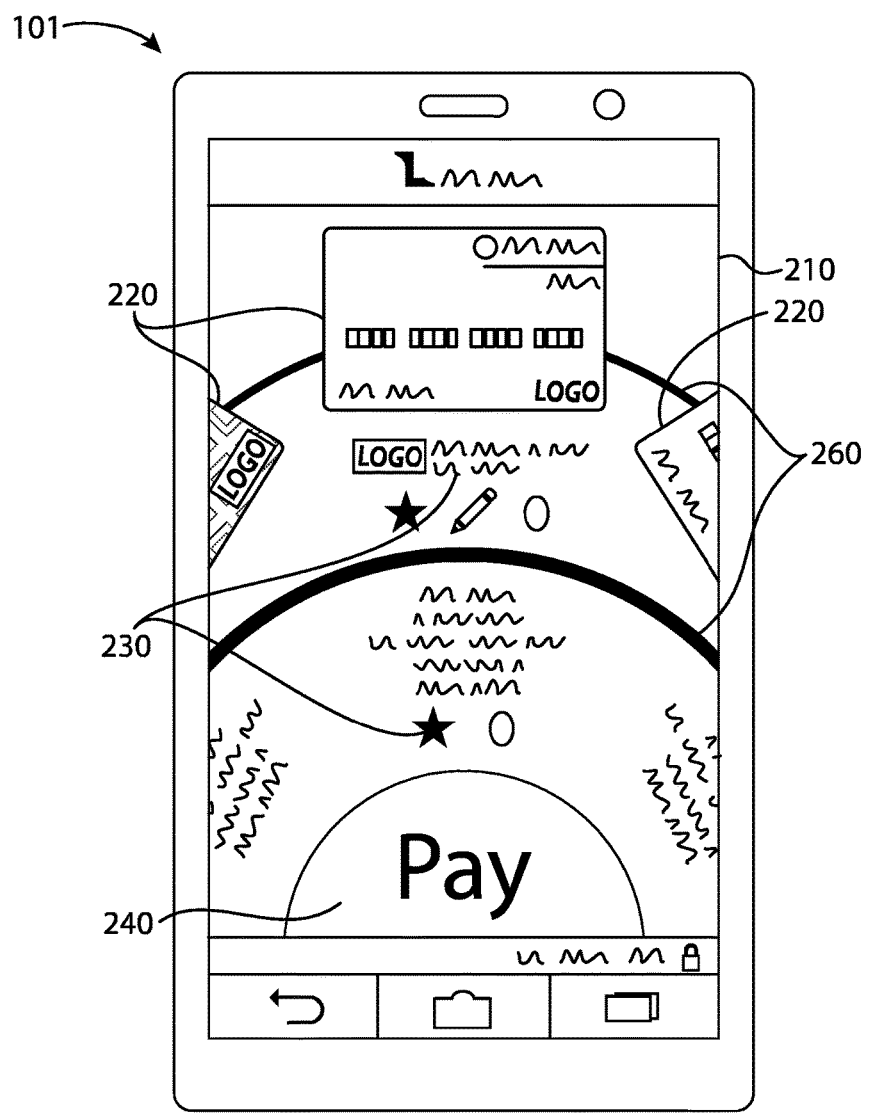
FIGS. 2C-2G are illustrations of sample displays in accordance with an embodiment of the subject technology.
Figure 2D:
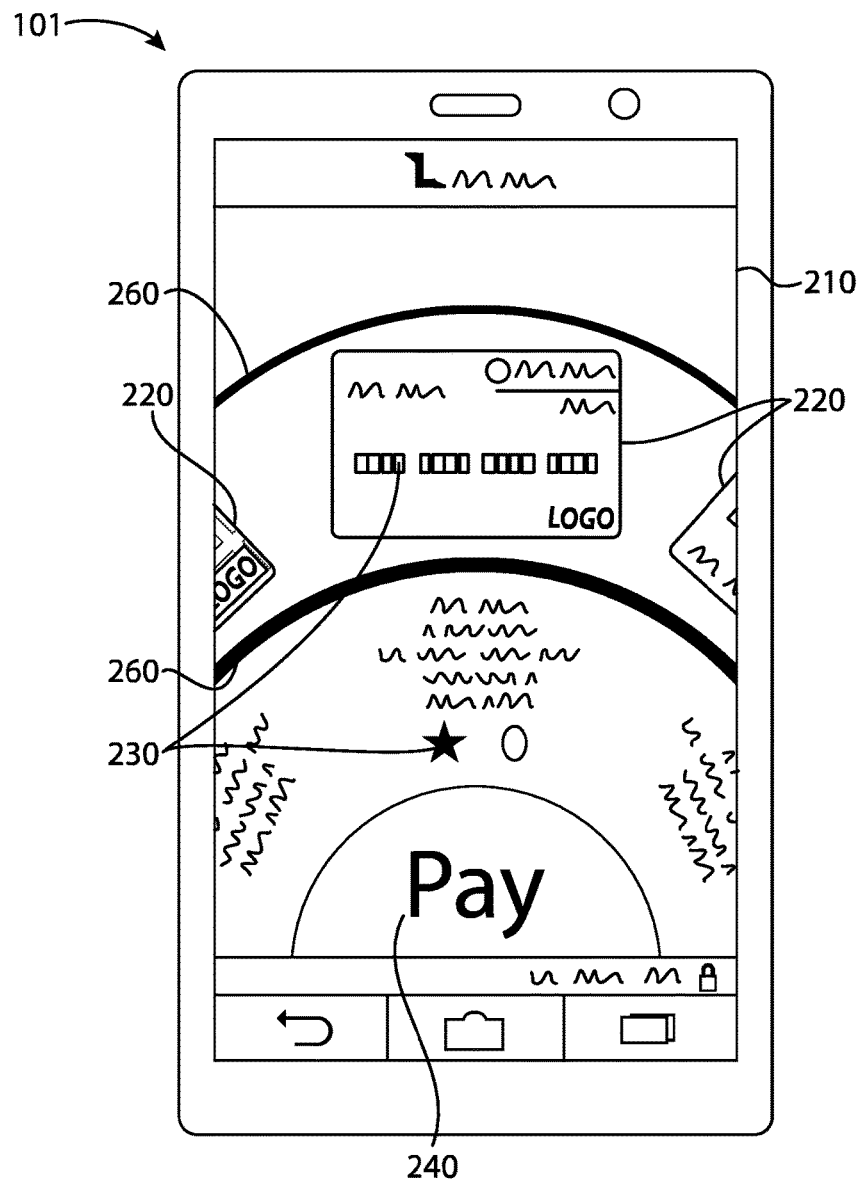
Figure 2E:
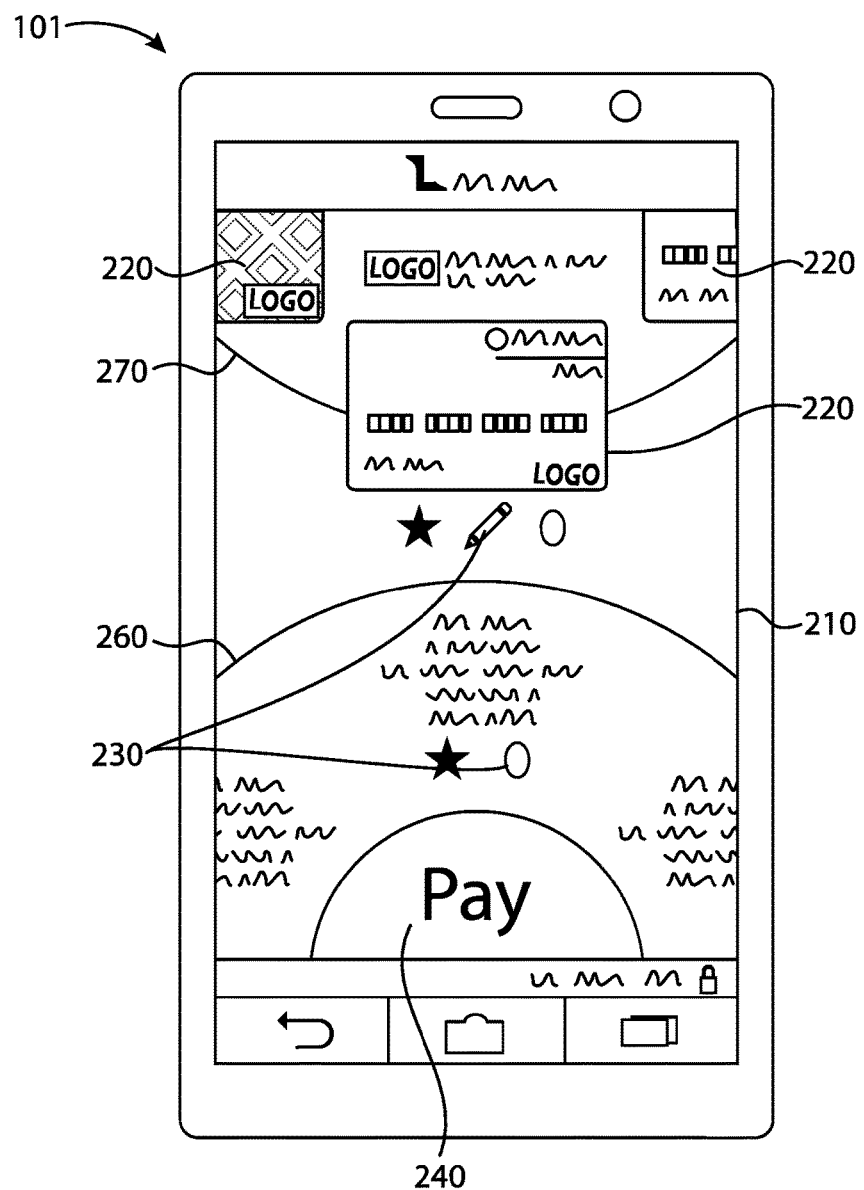
Figure 2F:
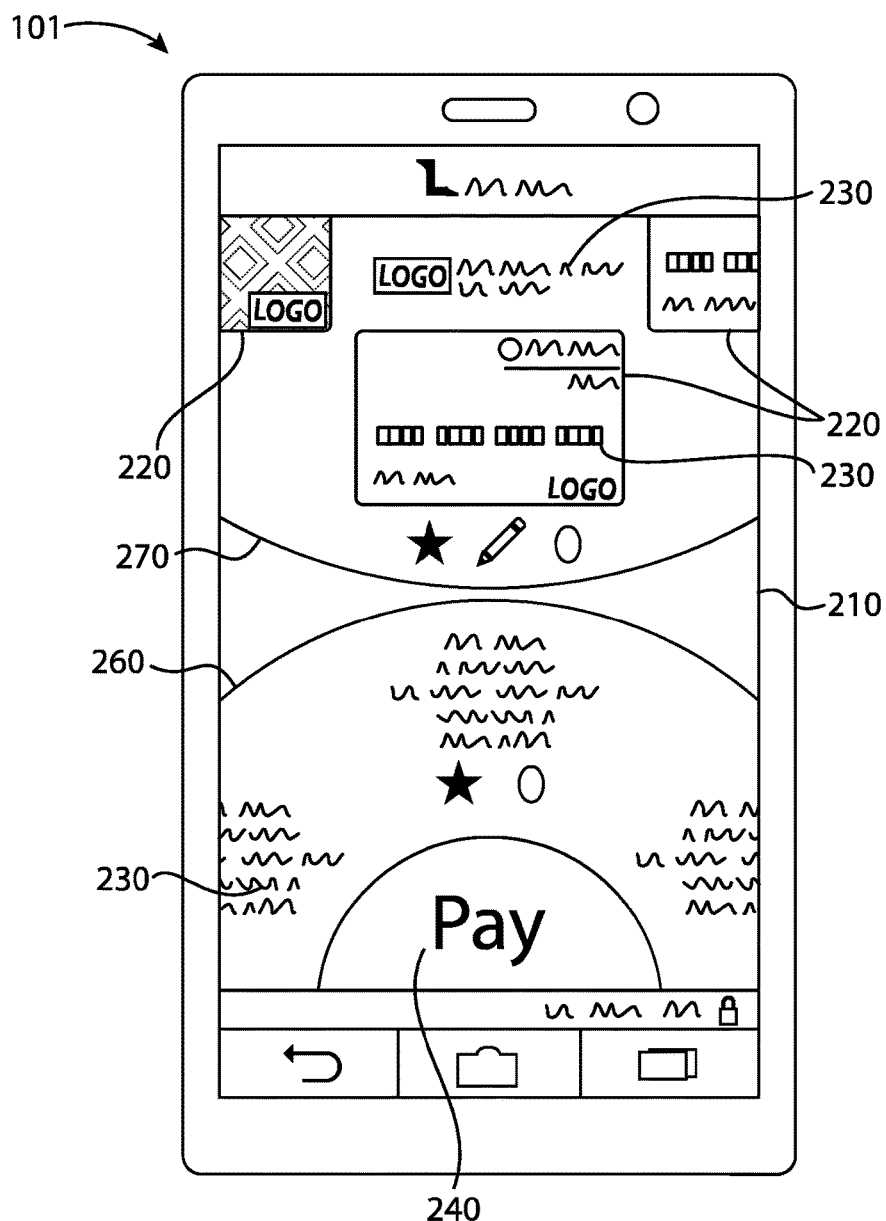
Figure 2G:
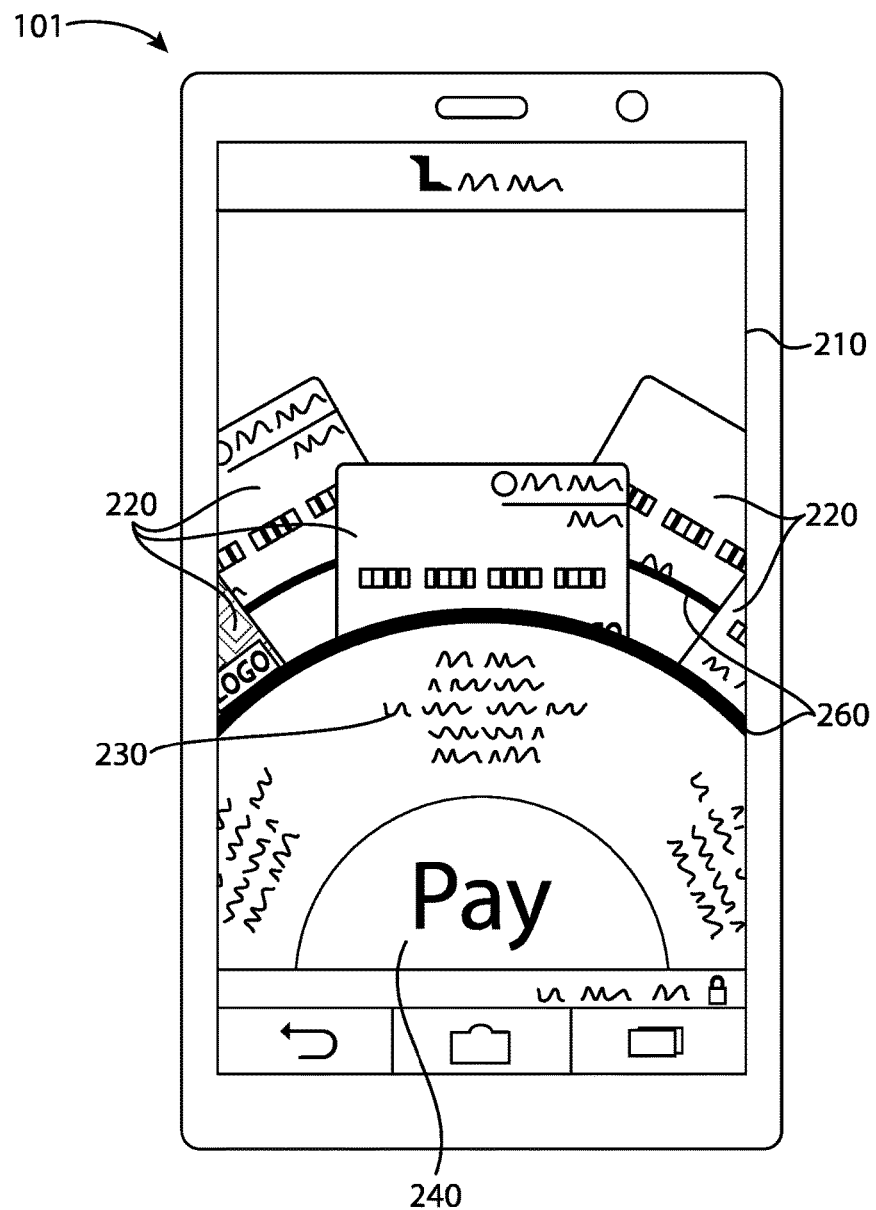
Figure 3A:
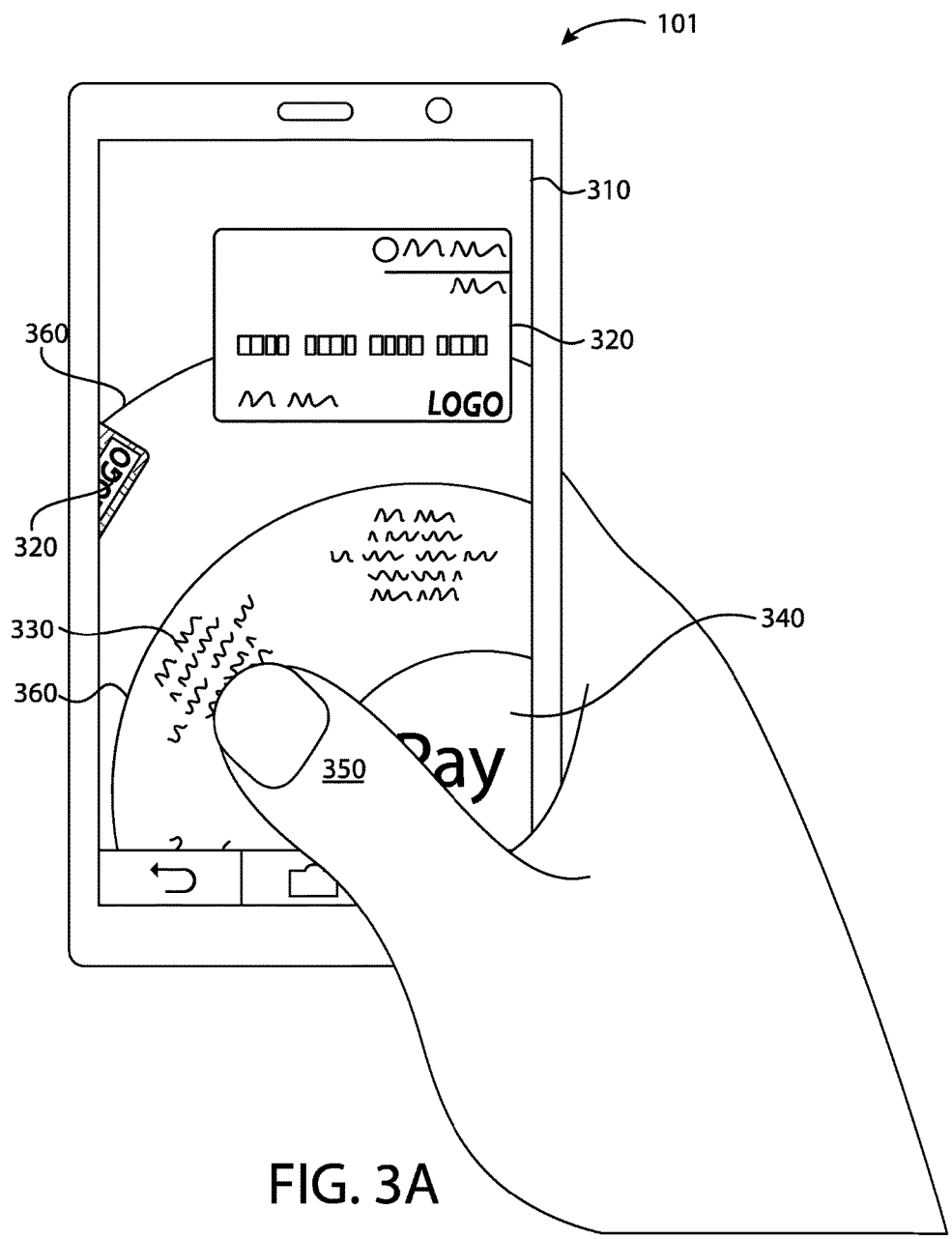
FIG. 3A is an illustration of a sample display oriented for a right-handed user as held by a user.
Figure 3B:
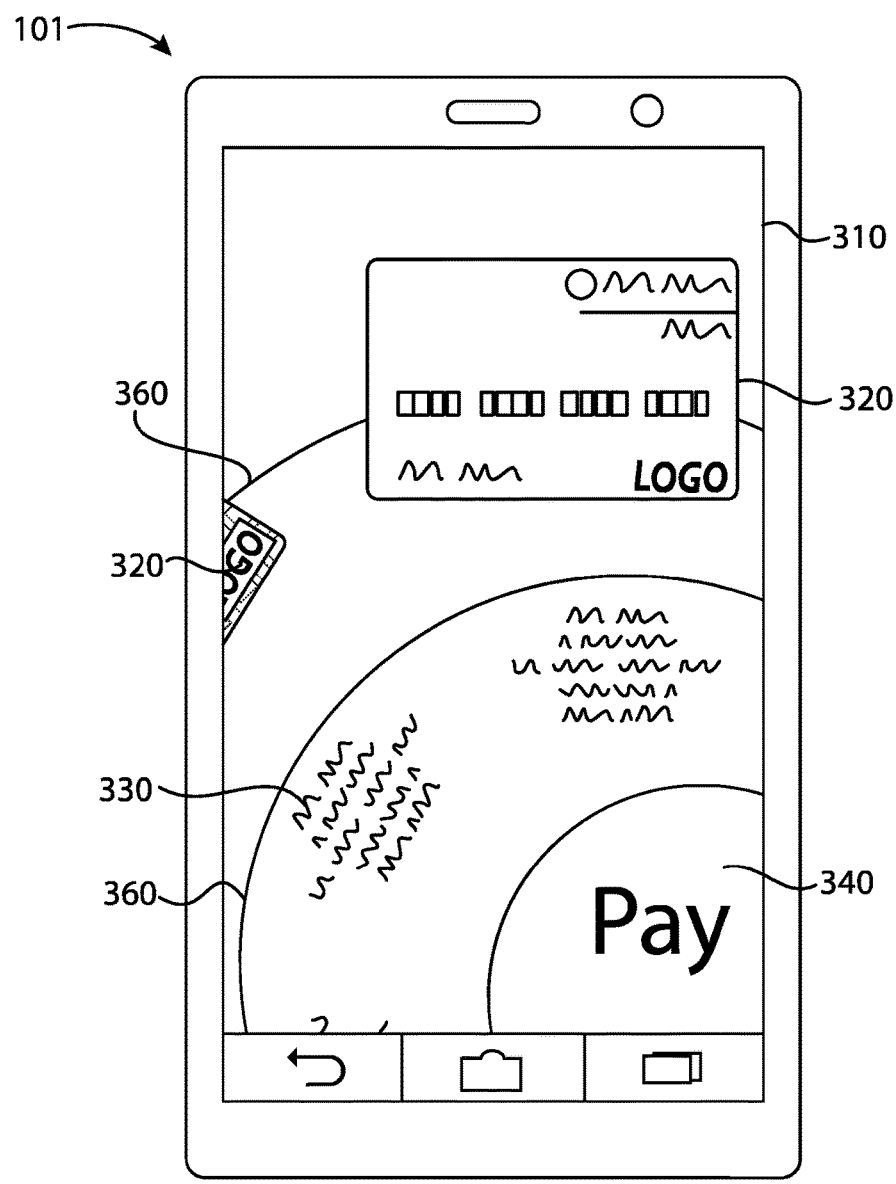
FIG. 3B is an illustration of the sample display of FIG. 3A.
Figure 3C:
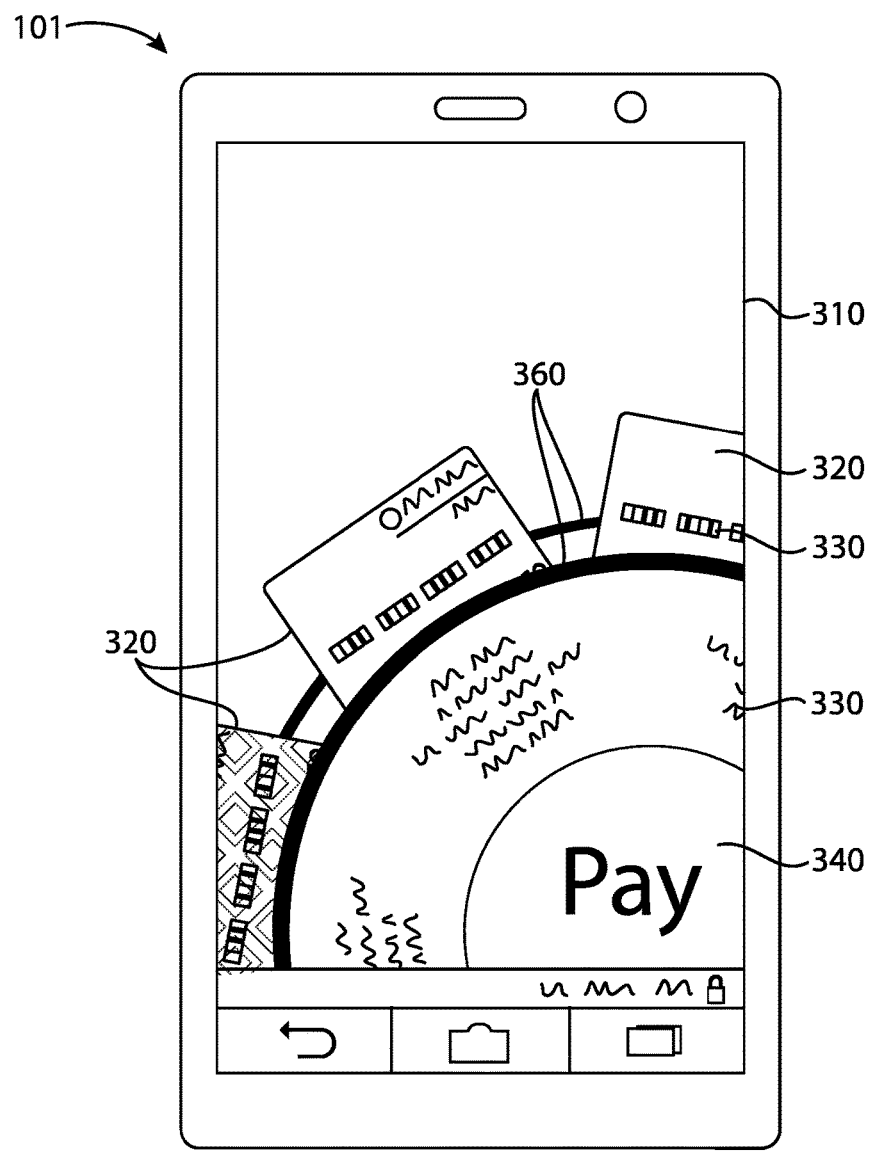
FIGS. 3C-3D are illustrations of sample displays in accordance with embodiments of the subject technology oriented for a right-handed user.
Figure 3D:
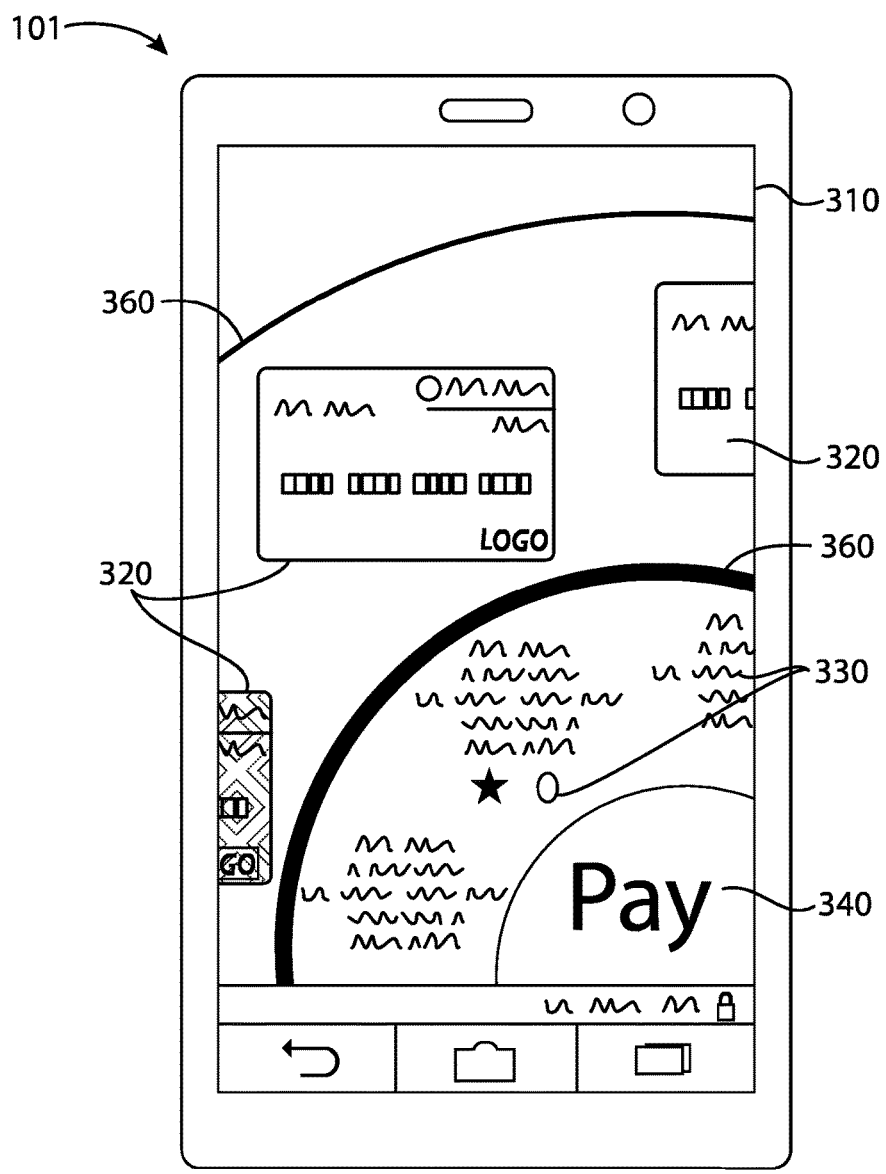
Figure 4A:
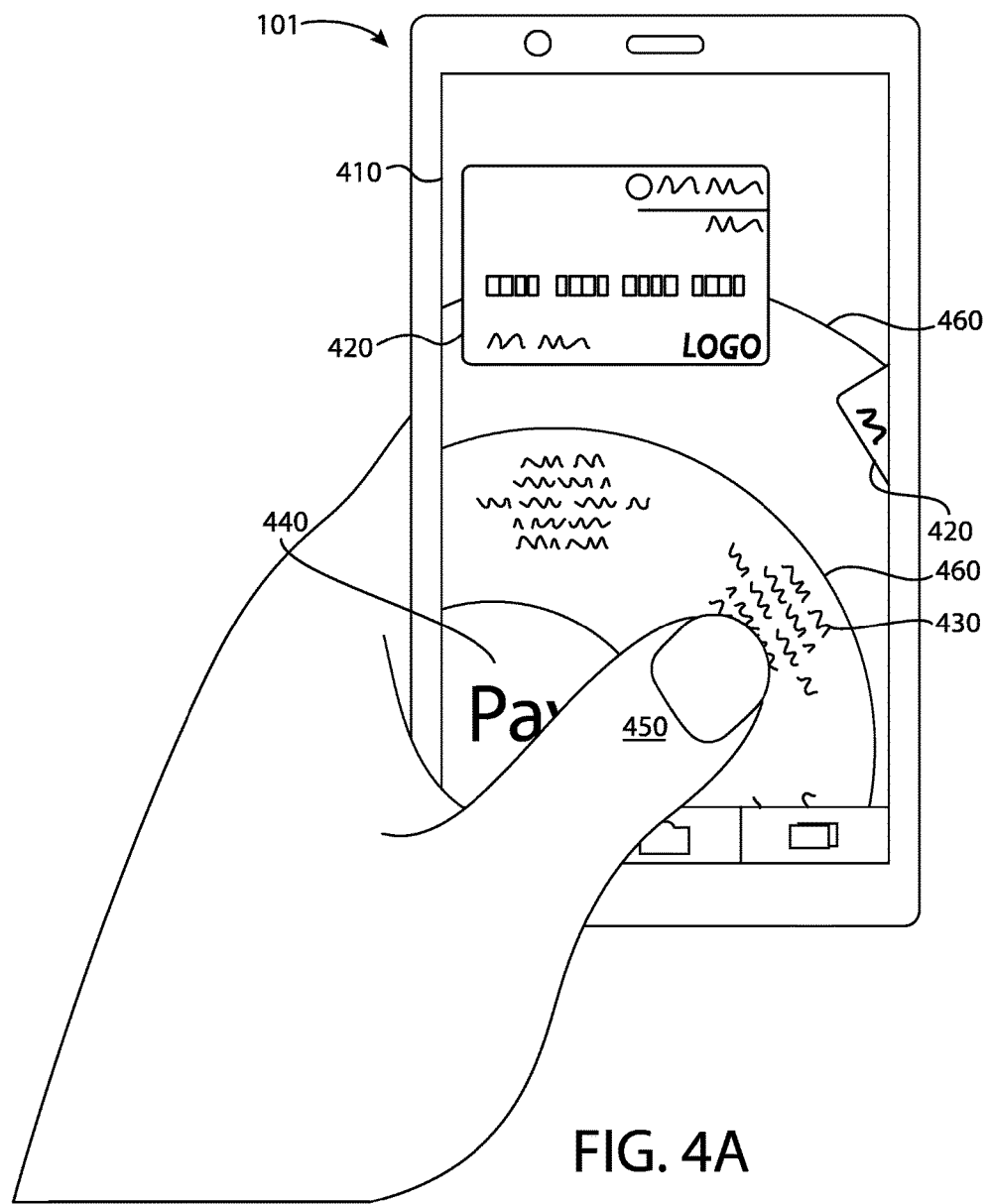
FIG. 4A is an illustration of a sample display oriented for a left-handed user as held by a user.
Figure 4B:
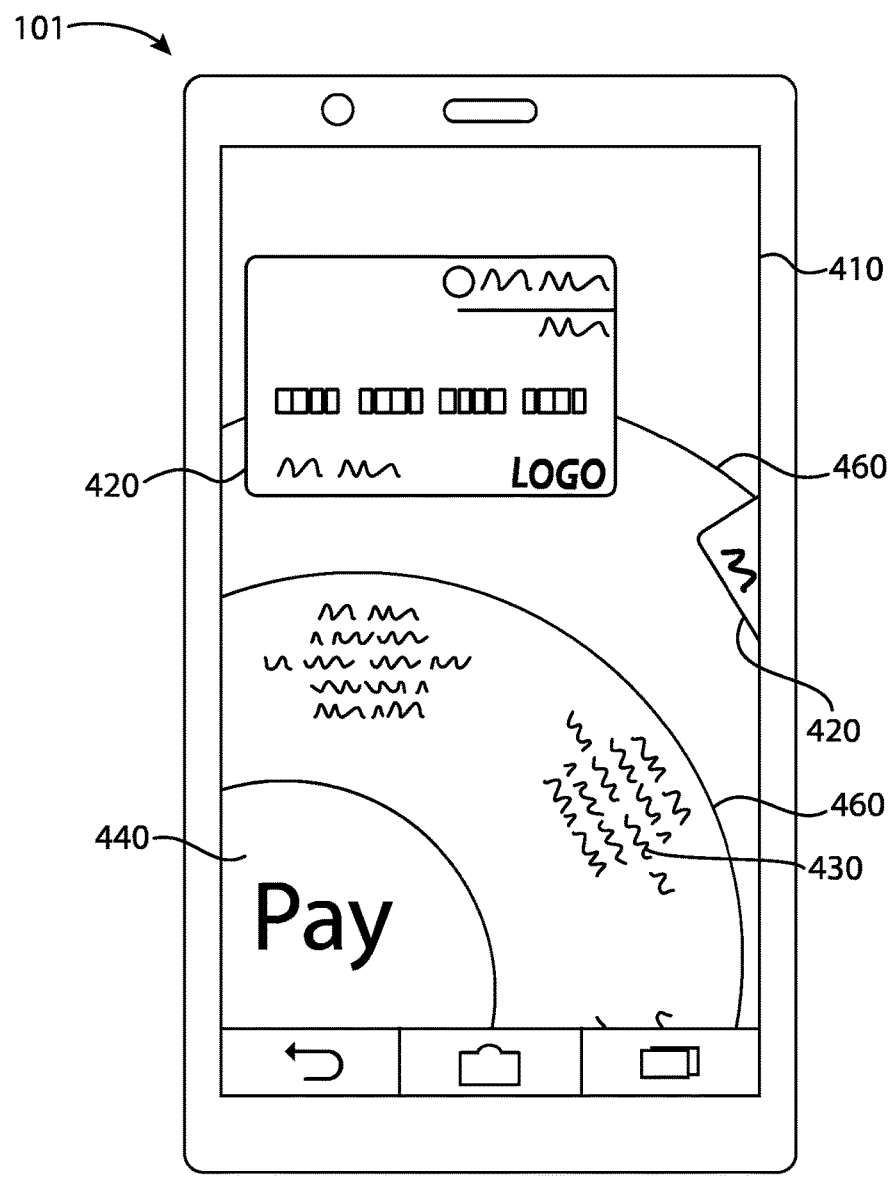
FIG. 4B is an illustration of the sample display of FIG. 4A.
Figure 4C:
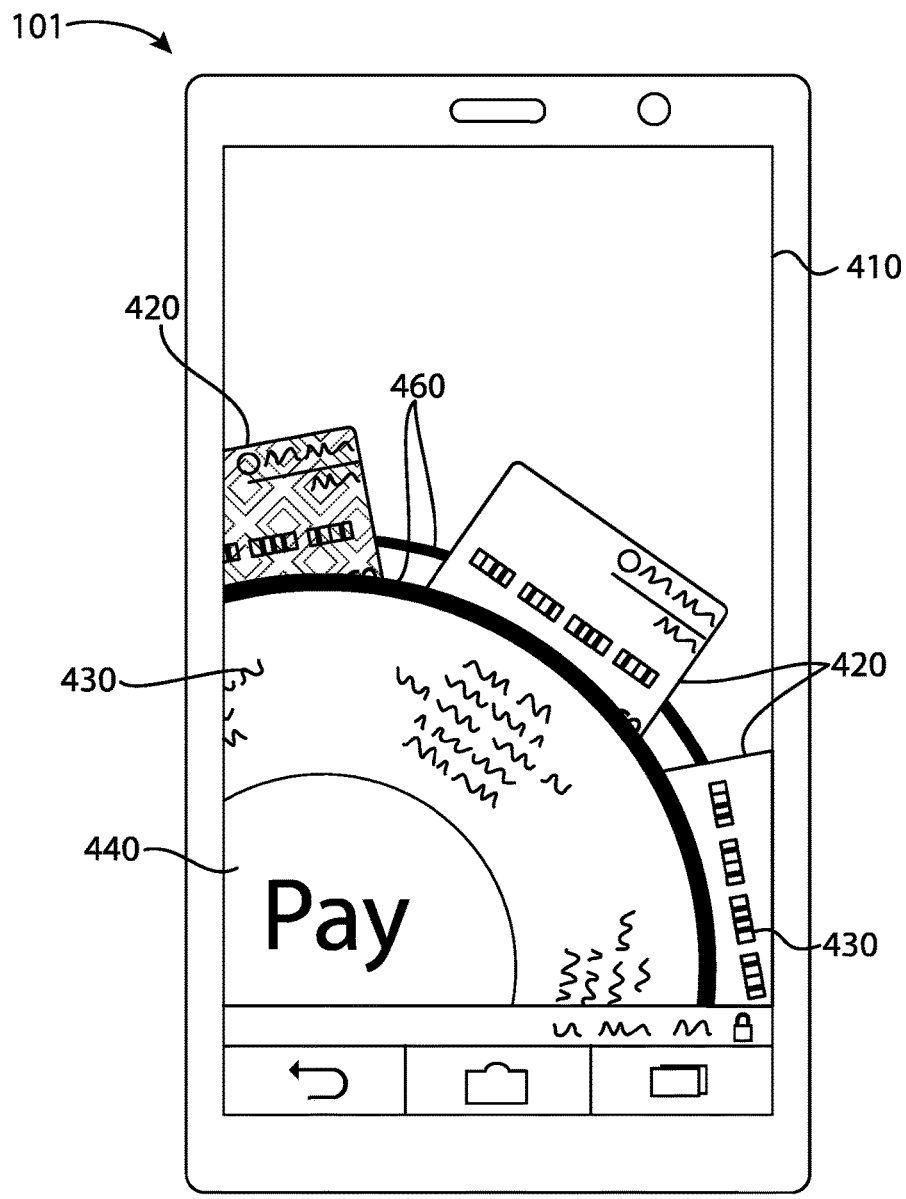
FIGS. 4C-4D are illustrations of sample displays in accordance with embodiments of the subject technology oriented for a left-handed user.
Figure 4D:
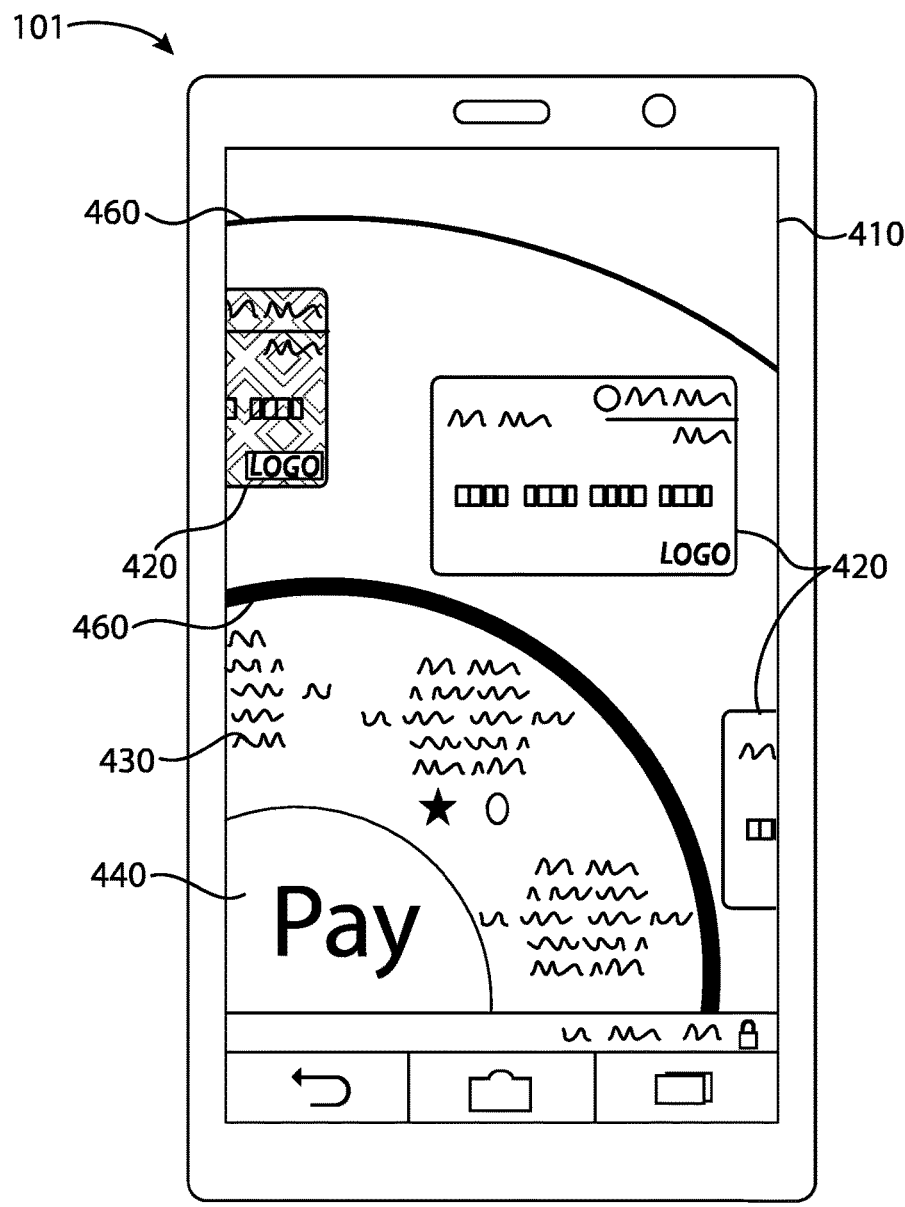
Figure 5A:
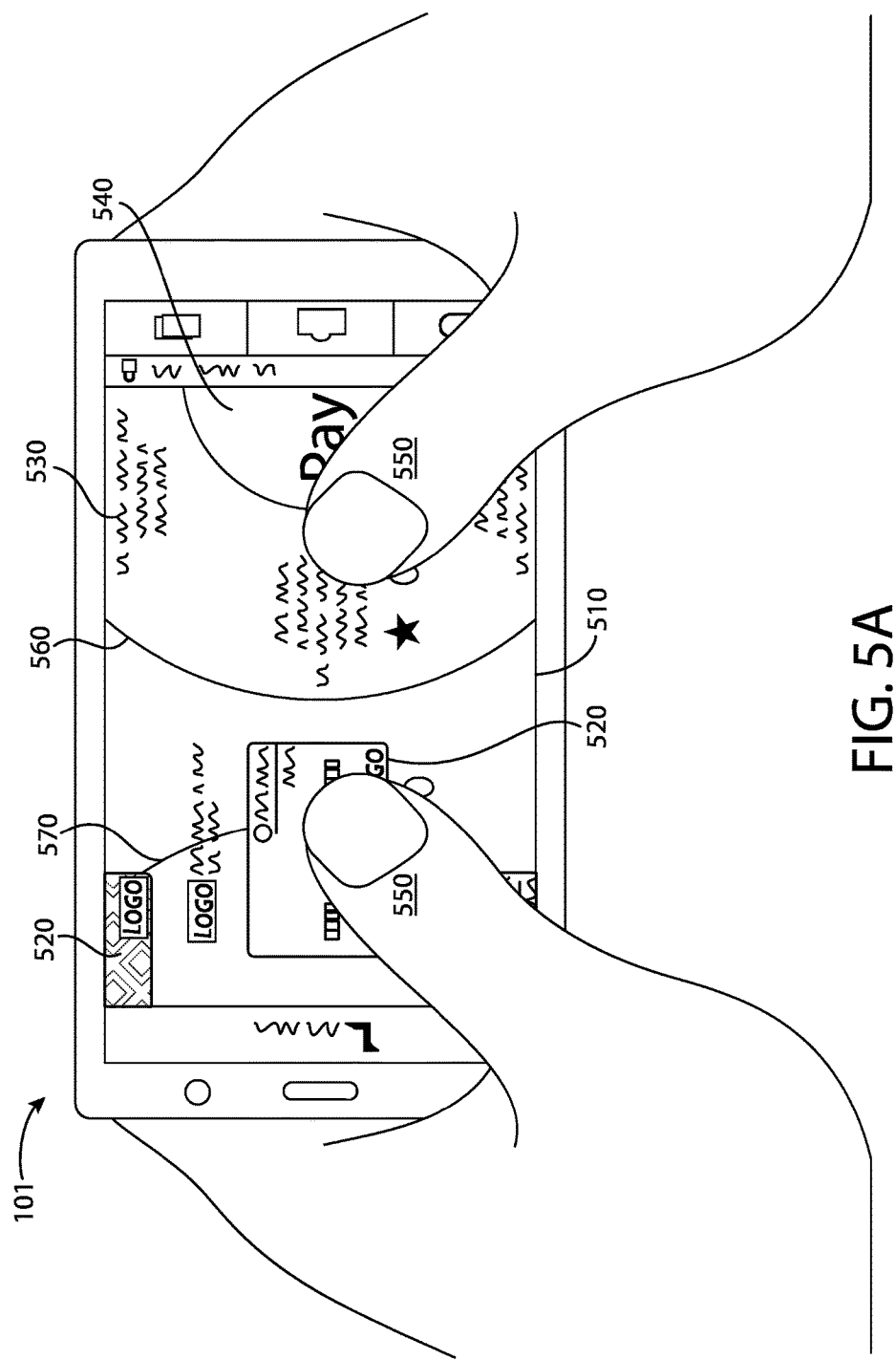
FIG. 5A is an illustration of a sample landscape display oriented for a right-handed user as held by a user.
Figure 5B:
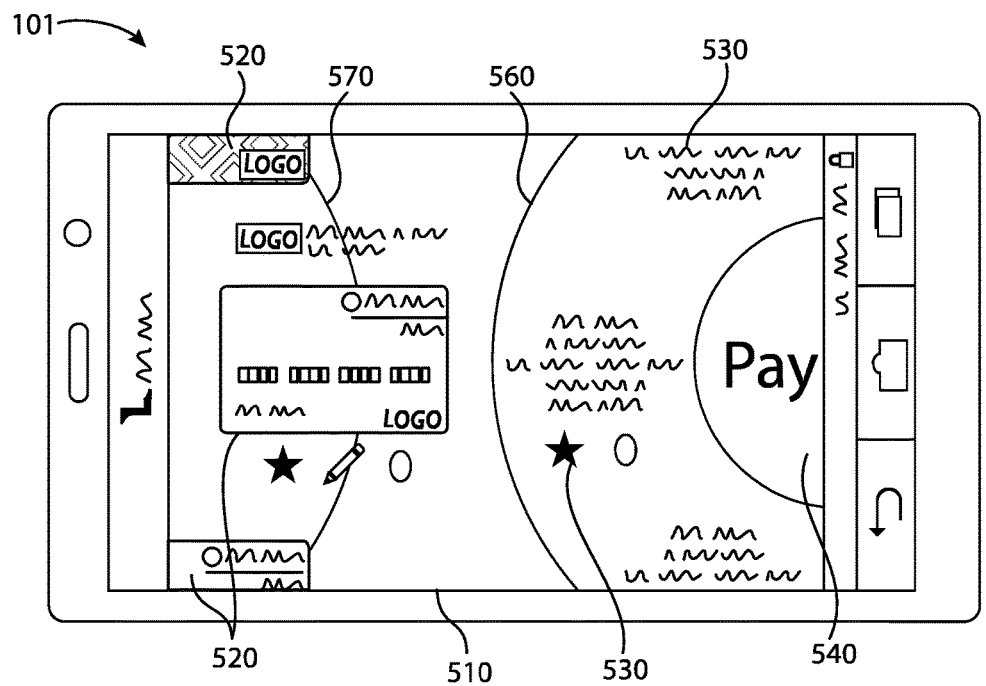
FIG. 5B is an illustration of the sample display of 5A.
Figure 5C:
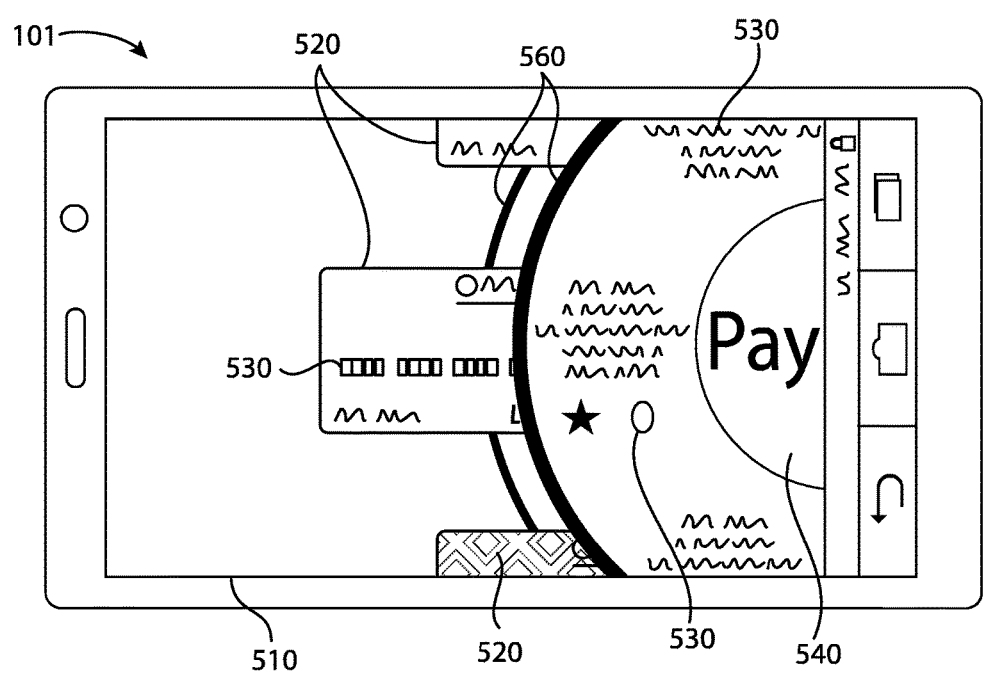
FIGS. 5C-5E are illustrations of sample landscape displays in accordance with embodiments of the subject technology oriented for a right-handed user.
Figure 5D:
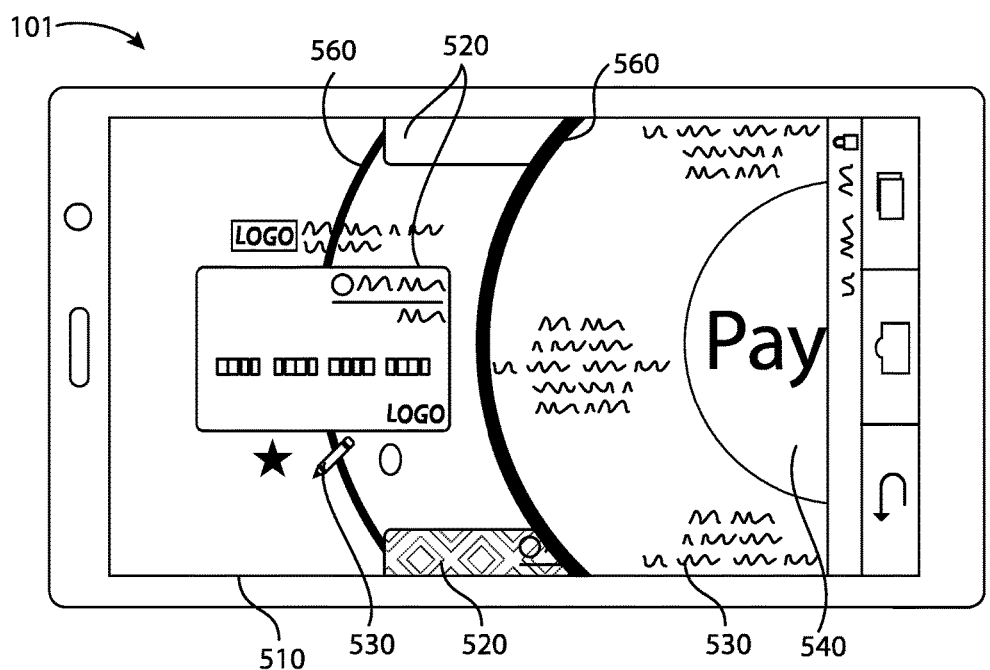
Figure 5E:
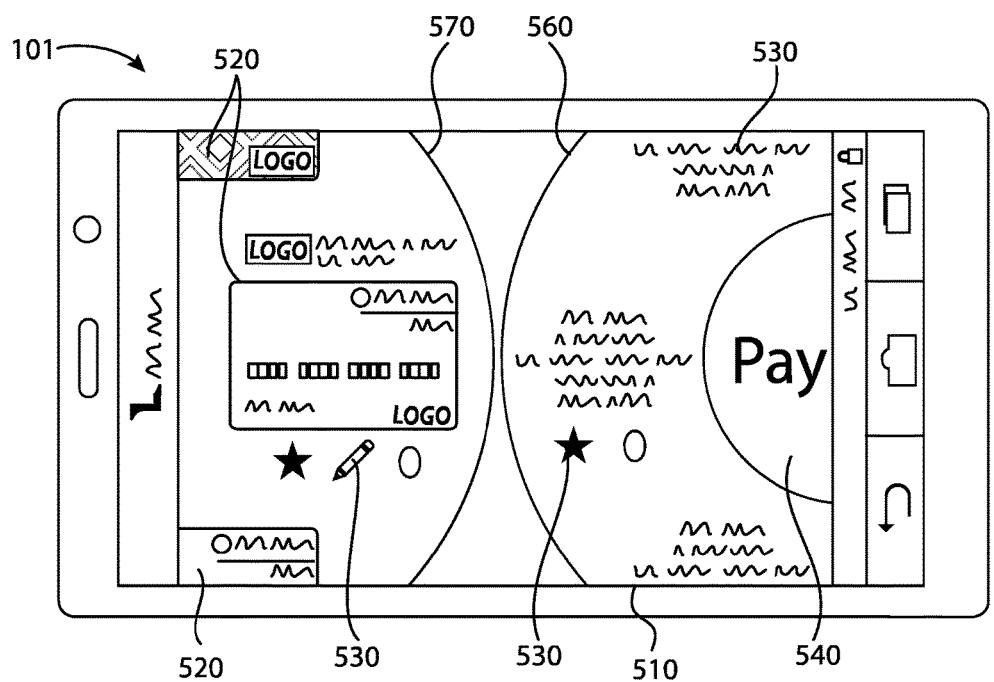
Figure 6A:
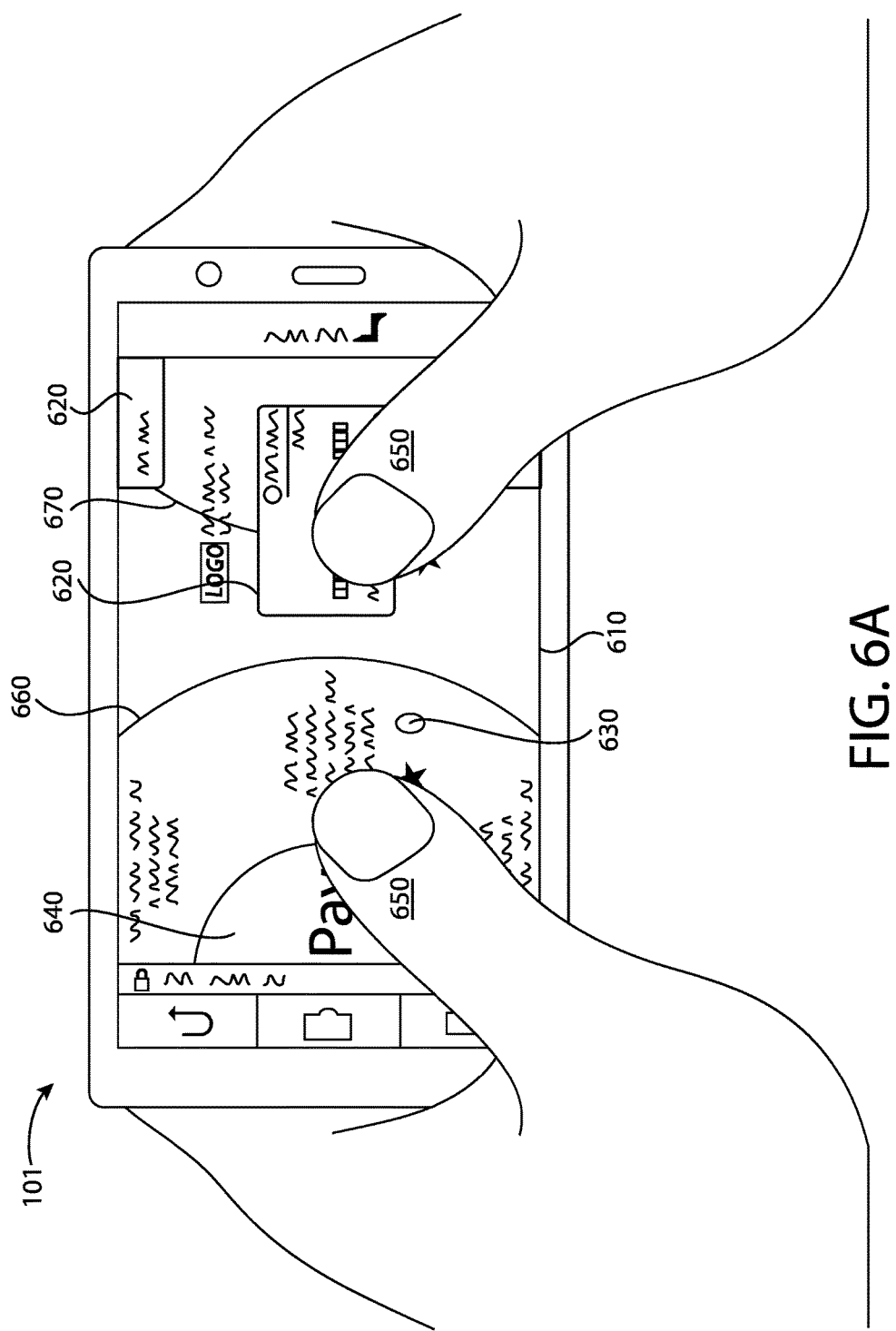
FIG. 6A is an illustration of a sample landscape display oriented for a left-handed user as held by a user.
Figure 6B:
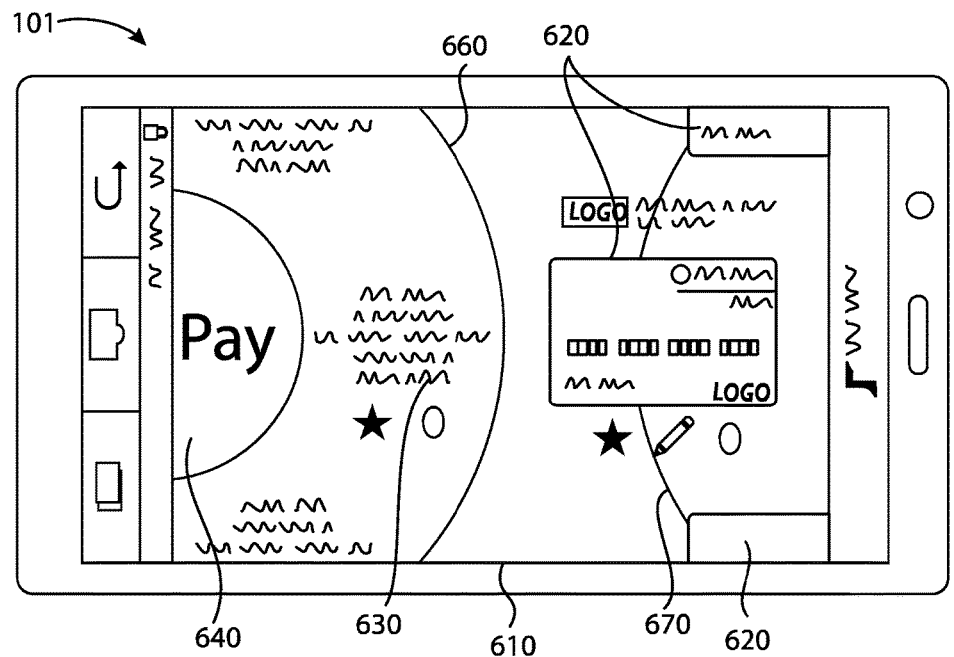
FIG. 6B is an illustration of the sample display of 6A.
Figure 6C:
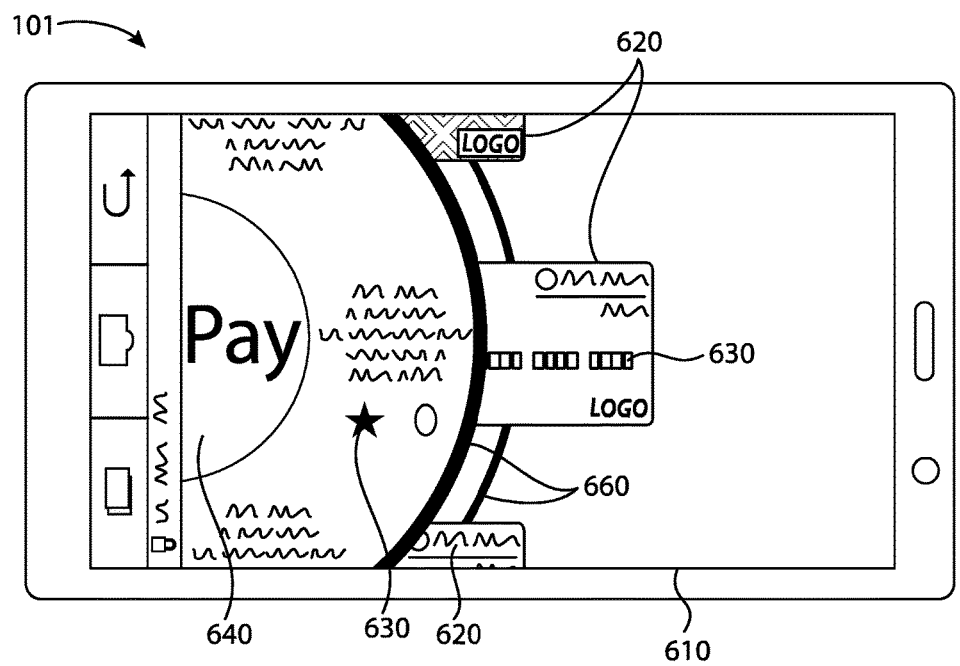
FIGS. 6C-6E are illustrations of sample landscape displays in accordance with embodiments of the subject technology oriented for a left-handed user.
Figure 6D:
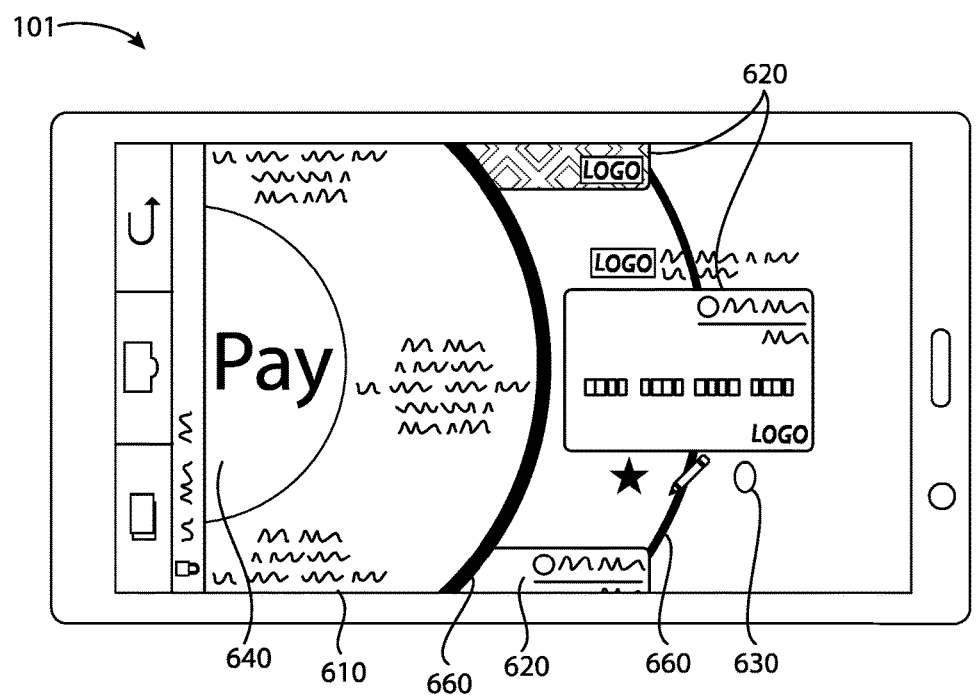
Figure 6E:
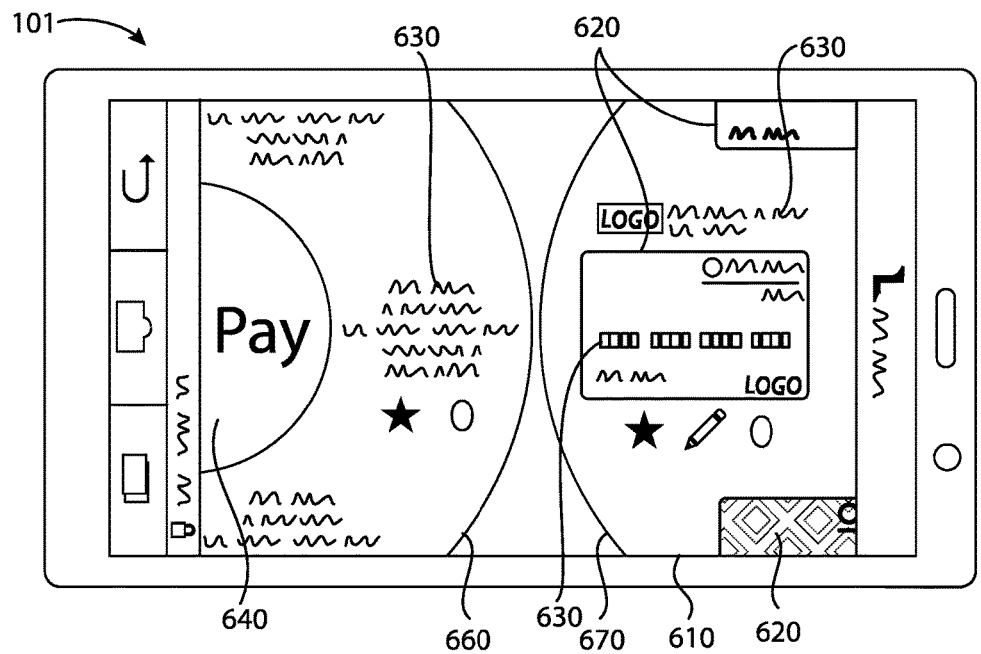

In block B120, if the user swipes in a vertical direction, additional information about an object maybe displayed. Changes in the display as a result of a vertical swipe will be described in relation to FIGS. 2A-2F. If the user vertically swipes her thumb 250 in the upward direction originating at the center-most object 220 of FIGS. 2A and 2B, concentric circles 260 and the additional objects 220 and information 230 that are associated with the concentric arc 260 may move vertically upward on the graphical user interface 210. Additional information 230 may be displayed as a result of this upward motion on the object 220 as shown in FIG. 2D. Additional information 230 may be provided on the top of object 220 and also below the object 230 as shown in FIG. 2C. A long vertical swipe, such as a swipe spanning approximately 50% or more of the vertical distance of the screen may cause the concentric arc 260 to be reoriented as shown with the arcs 270 in FIG. 2E and FIG. 2F.

In block B130, if the user swipes down less information may be displayed about the object. Similar to the previous paragraph, if the graphical user interface is in the position as shown in FIGS. 2C-2F and the user swipes down with the user's motion originating at the center-most object 220, the concentric circles may be collapsed back down as shown in FIGS. 2A and 2B, thereby displaying less information 230. As shown in FIGS. 2C-2D, a shorter, localized swipe, e.g., a swipe spanning less than 25% of the screen, may result in displaying less information 230 below centermost object 220.

In block B140, if the user swipes laterally, an additional object is displayed. User input for a lateral swipe may include a horizontal movement or an arc shaped movement. For example, if the user swipes horizontally near or on either of the concentric circles 260 of FIG. 2A, the objects and/or information the display of objects and information may rotate so that a different object or set of information is centrally displayed. The speed of the user's swipe may provide further input, dictating that two objects may advance, or that the objects associated displayed on the respective concentric circle may appear to "spin."

In block B150, if the user taps, the object is selected for use in the electronic transaction. User input for a tap may include a single tap, two taps in succession, or other combination of taps in order to make a selection. For example, a single tap on an object 220 may select the corresponding credit card for the electronic transaction while two double taps on an object 220 representing a credit card of the user may set the credit card of associated with the object 220 as the default card that defaults to the center-most location of the graphical user interface 220. Alternatively, the card that is used for the most transactions may automatically be set as the default center-most location on a concentric circle 260. A tap on the pay indicator 240 may initiate or complete the transaction.

These inputs and others that have been disclosed above may also be used with the graphical user interface of the remaining figures. A display that is oriented for right-handed user when the handheld device 101 is held in the portrait position as shown in FIGS. 3A-3D or by a display that is oriented for a left-handed user in FIGS. 4A-4D, respectively. In order to provide an aesthetic and a more convenient graphical user interface that can be navigated with one hand, pay indicator 340 and 440 may be located toward the right or left of the screen, respectively. The handedness orientation of the graphical user interface 310 and 410 may be automatically determined based on received user input, which may use a learning algorithm to determine whether the user operates the phone primarily with the right or the left hand. Upon detection of the handedness, the graphical user interface 310 and 410 may automatically adjust to complement the dominant hand. Alternatively or additionally, the user may select the handedness preference through additional navigation screens which may set the handedness orientation for the graphical user interface.

In addition to handedness detection, the graphical user interface may additionally determine the relative size of the user's thumb or hand based on previously entered user input. Such relative size determination may be determined based on user input in a set of calibration screens or may be determined based on a learning algorithm. Such relative size based determination may be applied to any screen of the figures, which resizes the scale of the objects, information, and indicators to provide access to each portion of the graphical user interface comfortably with a single hand. Due to the dexterity or size of a user's hand, one layout of the graphical user interface may be more comfortable for a user regardless of handedness. For example, the "left-handed" layout for a right handed user may be determined to be to appropriate layout based on the mobility or size of the user's thumb. Accordingly, the "left-handed" layout may be provided to the user based on user selection, determination through user input, or determination through calibration screens.

These inputs and customizations that have been disclosed above may also be used with a display that is oriented for a right-handed or left-handed user when the handheld device 101 is held in the landscape position as shown in FIGS. 5A-5E and FIGS. 6A-6E, respectively. In the landscape position, both of the user's hands may be used to provide input to the graphical user interfaces 510 and 610. The pay indicator 540 and 640 may appear on the side of the graphical user interfaces corresponding to the dominant hand. The graphical user interface may switch back and forth from portrait to landscape orientations based on the physical orientation of the entire handheld device 101.

Figure 7:
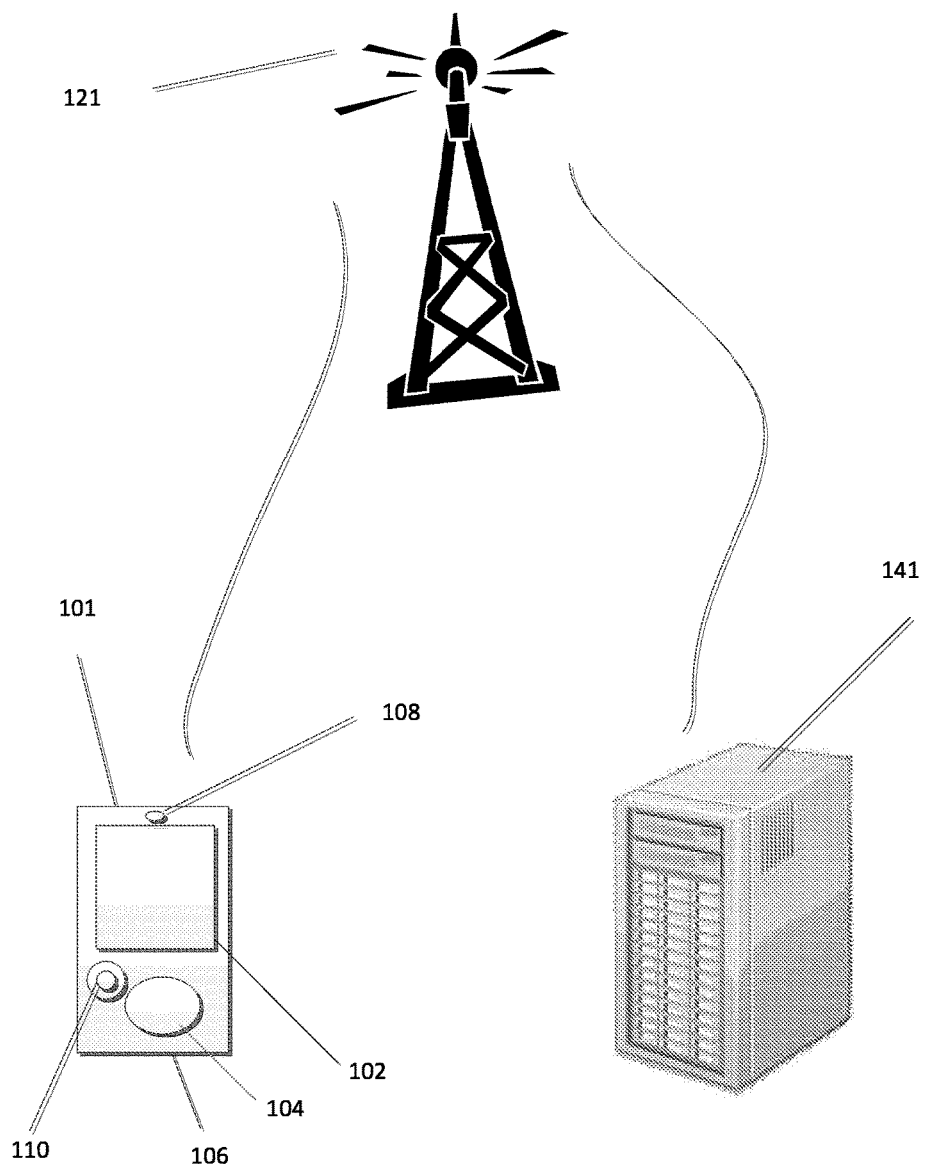
FIG. 7 is an illustration of a sample computing environment physically configured to execute the embodiments of the method.
Figure 8:
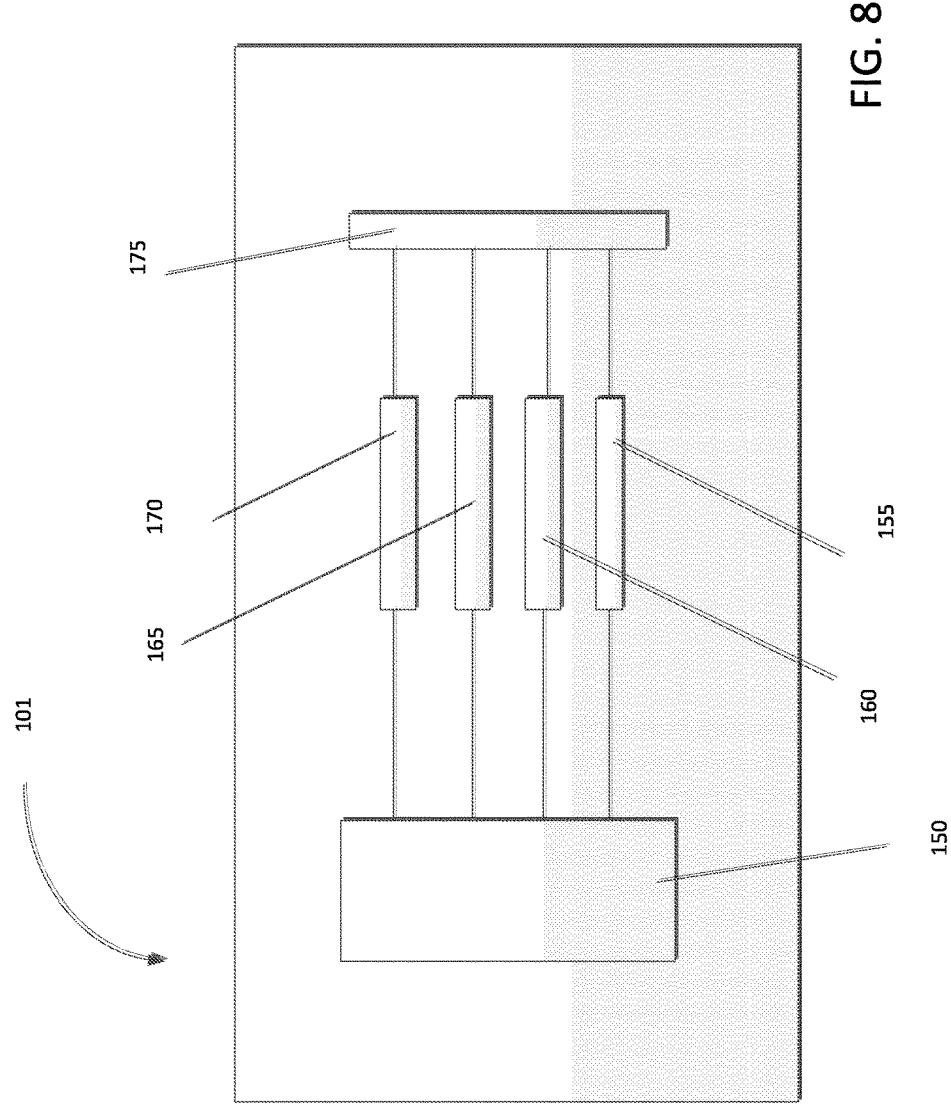
FIG. 8 is an illustration of a portable computing device which is physically configured according to embodiments of the method.

FIG. 7 may be a high level illustration of some of the elements in a sample computing system that may be physically configured to execute the various embodiments of the method. The computing system may be a dedicated computing device 141, a dedicated portable computing device 101, an application on the computing device 141, an application on the portable computing device 101 or a combination of all of these. FIG. 8 may be a high level illustration of a portable computing device 101 communicating with a remote computing device 141 through a communication device 121 but the application may be stored and accessed in a variety of ways. In addition, the application may be obtained in a variety of ways such as from an app store, from a web site, from a store WiFi system, etc. There may be various versions of the application to take advantage of the benefits of different computing devices, different computing languages and different API platforms.

In one embodiment, a portable computing device 101 may be a device that operates using a portable power source 155 such as a battery (FIG. 8). Referring to FIG. 7, the portable computing device 101 may also have a display 102 which may or may not be a touch sensitive display. More specifically, the display 102 may have a capacitance sensor, for example, that may be used to provide input data to the portable computing device 101. In other embodiments, an input pad 104 such as arrows, scroll wheels, keyboards, etc., may be used to provide inputs to the portable computing device 101. In addition, the portable computing device 101 may have a microphone 106 which may accept and store verbal data, a camera 108 to accept images and a speaker 110 to communicate sounds.

The portable computing device 101 may be able to communicate with a computing device 141 or a plurality of computing devices 141 that make up a cloud of computing devices 111 through a communication device 121. The portable computing device 101 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 141 or may be through a communication device or network of devices 121 such as cellular service, through the Internet, through a private network, through Bluetooth, through near field communications, etc. FIG. 8 may be a simplified illustration of the physical elements that make up a portable computing device 101 and FIG. 9 may be a simplified illustration of the physical elements that make up a server type computing device 141.

Referring to FIG. 8, a sample portable computing device 101 may be physically configured according to a method to be part of the system. The portable computing device 101 may have a processor 150 that is physically configured according to computer executable instructions. It may have a portable power supply 155 such as a battery which may be rechargeable. It may also have a sound and video module 160 which assists in displaying video and sound and may turn off when not in use to conserve power and battery life. The portable computing device 101 may also have volatile memory 165 and non-volatile memory 170. There also may be an input/output bus 175 that shuttles data to and from the various user input devices such as the microphone 106, the camera 108 and other inputs 102, etc. It also may control of communicating with the networks, either through wireless or wired devices. Of course, this is just one embodiment of the portable computing device 101 and the number and types of portable computing devices 101 is limited only by the imagination. The portable computing device 101 may act as the display 102 or may be a part of the display 102.

Figure 9:
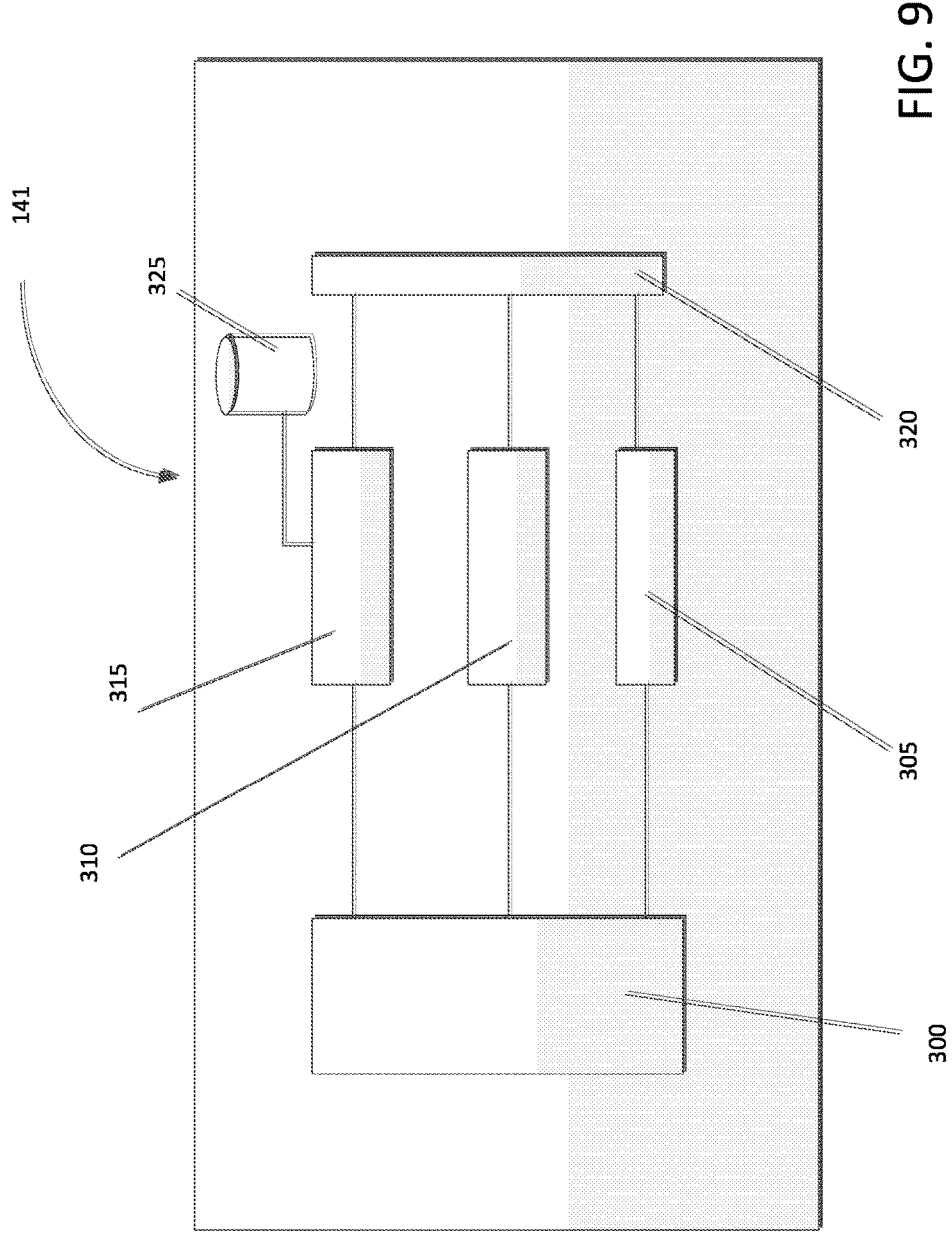
FIG. 9 is an illustration of a server type computing device which is physically configure according to the embodiments of the method.

The physical elements that make up the remote computing device 141 may be further illustrated in FIG. 9. At a high level, the computing device 141 may include a digital storage such as a magnetic disk, an optical disk, flash storage, non-volatile storage, etc. Structured data may be stored in the digital storage such as in a database. The server 141 may have a processor 300 that is physically configured according to computer executable instructions. It may also have a sound and video module 305 which assists in displaying video and sound and may turn off when not in use to conserve power and battery life. The server 141 may also have volatile memory 310 and non-volatile memory 315.

The database 325 may be stored in the memory 310 or 315 or may be separate. The database 325 may also be part of a cloud of computing device 141 and may be stored in a distributed manner across a plurality of computing devices 141. There also may be an input/output bus 320 that shuttles data to and from the various user input devices such as the microphone 106, the camera 108, the inputs 102, etc. The input/output bus 320 also may control of communicating with the networks, either through wireless or wired devices. In some embodiments, the application may be on the local computing device 101 and in other embodiments, the application may be remote 141. Of course, this is just one embodiment of the server 141 and the number and types of computing devices 141 is limited only by the imagination.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A computer-implemented method for providing a graphical user interface (GUI) on a touch screen device, the method comprising:

displaying, on an input display of the touch screen device, the GUI with a first concentric arc and a second concentric arc in a starting position near a first end of the input display, wherein displaying the GUI further comprises displaying at least one object between the first concentric arc and the second concentric arc, wherein the second concentric arc defines an area to the first end of the display where the area obscures at least a part of the at least one object, wherein the displayed GUI is oriented to be operable by inputs of a user;

accepting the inputs from the user;

in response to one of the accepted inputs being swiping in a first direction from a centermost object associated with the first concentric arc, displaying additional information about an object associated with the first concentric arc while relocating objects surrounding the object on the input display such that the object is visible to the user;

transitioning the first concentric arc in the first direction to an inverted concentric arc to a second end of the input display while the GUI maintains the second concentric arc in the starting position on the input display;

in response to the inputs indicating a swiping in a second direction, displaying less information about the object directly proportional to a distance of the second direction from the centermost object;

in response to the inputs indicating a swiping in a third direction, displaying an additional object and information to be arranged along the concentric arc; and in response to one of the accepted inputs being tapping on the display, selecting the object for use in an electronic transaction.

2. The computer-implemented method of claim 1, wherein the input display is oriented for left-handed use if the inputs of the user are detected to be associated with the left hand of the user.

3. The computer-implemented method of claim 1, wherein the input display is oriented for right-handed use if the inputs of the user are detected to be associated with the right hand of the user.

4. The computer-implemented method of claim 1, further comprising displaying the GUI for customization information of the handedness of the user.

5. The computer-implemented method of claim 1, wherein the GUI is oriented in a landscape position.

6. The computer-implemented method of claim 2, wherein the input display is oriented for a left-handed user in both a portrait and in a landscape position.

7. The computer-implemented method of claim 3, wherein the display is oriented for a right-handed user in both a portrait and in a landscape position.

8. The computer-implemented method of claim 1, further comprising displaying objects along an arc, wherein the arcs are sized based on the actions of the thumb of the user.

9. The computer-implemented method of claim 1, further comprising calibrating the input display based on calibration movements of the user to determine the handedness of the user and the size of the thumbs of the user.

10. A computer-implemented apparatus for providing a graphical user interface (GUI) for an electronic transaction comprising:

an touch input display displaying the GUI with a first concentric arc and a second concentric arc in a starting position, wherein the touch input display displays at least one object between the first concentric arc and the second concentric arc in the GUI, wherein the second concentric arc defines an area to the one end of the touch input display where the area obscures at least a part of the at least one object, wherein the GUI is oriented to be operable by inputs of a user;

wherein the touch input display accepts the inputs from the user;

a processor configured for execute computer-executable instructions to determine that in response to one of the accepted inputs being swiping in a first direction from a centermost object associated with the first concentric arc, provides additional information about an object associated with the first concentric arc to be displayed on the touch input display while the processor relocates objects surrounding the object on the touch input display such that the object becomes visible to the user, wherein the touch input display transitions the first concentric arc in the first direction to an inverted concentric arc to a second end of the touch input display while the GUI maintains the second concentric arc in the starting position on the touch input display;

if wherein the processor determines one of the accepted inputs being swiping in a second direction, the touch input display displays less information about the object;

if wherein the processor determines one of the accepted inputs being swiping in a third direction, the touch input display displays an additional object and information to be arranged along the concentric arc; and if wherein the processor determines one of the accepted inputs being tapping on the object, the processor identifies the object for use in the electronic transaction.

11. The computer-implemented apparatus of claim 10, wherein the GUI is oriented in a landscape position.

12. The computer-implemented apparatus of claim 10, further comprising displaying objects along an arc, wherein the arcs are sized based on the inputs of the user.

13. The computer-implemented apparatus of claim 10, further comprising calibrating the input display based on calibration movements of the user to determine the handedness of the user and the size of the inputs of the user.

14. A tangible non-transitory computer-readable medium storing computer-executable instructions for providing a graphical user interface (GUI) on a touch sensitive computing device, the computer-executable instructions comprising:

displaying, on an input display of the touch screen device, the GUI with a first concentric arc and a second concentric arc in a starting position near a first end of the input display, wherein displaying the GUI further comprises displaying at least one object between the first concentric arc and the second concentric arc, wherein the second concentric arc defines an area to the first end of the display where the area obscures at least a part of the at least one object, wherein the displayed GUI is oriented to be operable by inputs of a user;

accepting the inputs from the user;

in response to one of the accepted inputs being swiping in a first direction from a centermost object associated with the first concentric arc, displaying additional information about an object associated with the first concentric arc while relocating objects surrounding the object on the input display such that the object is visible to the user;

transitioning the first concentric arc in the first direction to an inverted concentric arc to a second end of the input display while the GUI maintains the second concentric arc in the starting position on the input display;

in response to the inputs indicating a swiping in a second direction, displaying less information about the object directly proportional to a distance of the second direction from the centermost object;

in response to the inputs indicating a swiping in a third direction, displaying an additional object and information to be arranged along the concentric arc; and in response to one of the accepted inputs being tapping on the display, selecting the object for use in an electronic transaction.

15. The tangible computer-readable medium of claim 14, wherein the inverted concentric arc comprises an inverted concentric arc with respect to the second concentric arc.

16. The tangible computer-readable medium of claim 14, wherein the computer-executable instructions further comprising displaying the GUI for customization information of the handedness of the user.

17. The tangible computer-readable medium of claim 14, wherein the GUI is oriented in a landscape position.

18. The tangible computer-readable medium of claim 14, wherein the input display is oriented for left-handed use if the inputs of the user are detected to be associated with the left hand of the user.

19. The tangible computer-readable medium of claim 14, wherein the input display is oriented for right-handed use if the inputs of the user are detected to be associated with the right hand of the user.

20. The tangible computer-readable medium of claim 14, wherein the computer-executable instructions further comprising displaying objects along an arc, wherein the arcs are sized based on the actions of the thumb of the user.

* * * * *